United States Patent
Tatsumi et al.

(10) Patent No.: US 11,046,907 B2
(45) Date of Patent: Jun. 29, 2021

(54) DEFOAMING AGENT AND LUBRICATING OIL COMPOSITION

(71) Applicant: ENEOS CORPORATION, Tokyo (JP)

(72) Inventors: Go Tatsumi, Tokyo (JP); Akira Takagi, Tokyo (JP)

(73) Assignee: ENEOS CORPORATION, Tokyo (JP)

(*) Notice: Subject to any disclaimer, the term of this patent is extended or adjusted under 35 U.S.C. 154(b) by 0 days.

(21) Appl. No.: 16/481,231

(22) PCT Filed: Feb. 22, 2018

(86) PCT No.: PCT/JP2018/006536
§ 371 (c)(1),
(2) Date: Jul. 26, 2019

(87) PCT Pub. No.: WO2018/155579
PCT Pub. Date: Aug. 30, 2018

(65) Prior Publication Data
US 2019/0390132 A1   Dec. 26, 2019

(30) Foreign Application Priority Data

Feb. 22, 2017   (JP) .............................. JP2017-031205

(51) Int. Cl.
  *C10M 155/02*   (2006.01)
  *B01D 19/04*   (2006.01)
  (Continued)

(52) U.S. Cl.
  CPC ....... *C10M 155/02* (2013.01); *B01D 19/0409* (2013.01); *C08G 77/442* (2013.01);
  (Continued)

(58) Field of Classification Search
  CPC ............ C10M 155/02; C10M 169/041; C10M 2203/003; C10M 2229/048;
  (Continued)

(56) References Cited

U.S. PATENT DOCUMENTS

| 4,082,690 A | 4/1978 | Farminer |
| 4,906,403 A | 3/1990 | Berger et al. |
| (Continued) | | |

FOREIGN PATENT DOCUMENTS

| CA | 2359946 | 7/2000 |
| CN | 1064884 A | 9/1992 |
| (Continued) | | |

OTHER PUBLICATIONS

NOA issued in U.S. Appl. No. 15/749,919 dated Dec. 3, 2019.
(Continued)

*Primary Examiner* — James C Goloboy
(74) *Attorney, Agent, or Firm* — Greenblum & Bernstein, P.L.C.

(57) ABSTRACT

A defoaming agent including a polymer, the polymer including: at least one first polymer chain including a polysiloxane structure represented by the following general formula (1); and at least one second polymer chain including a repeating unit represented by the following general formula (2) and bonded to the first polymer chain:

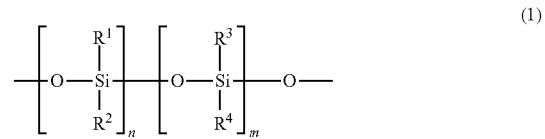

wherein in the formula (1), repeating units may be in any order; each of $R^1$ and $R^2$ is independently a $C_{1-18}$ organic group comprising no fluorine atom; at least one of $R^3$ and $R^4$ (Continued)

is the organic group comprising no less than 3 fluorine atoms; m is an integer of no less than 1; and n+m is 5 to 2000,

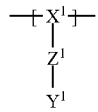
(2)

wherein in the formula (2), $X^1$ is a repeating unit obtainable by polymerization of an ethylenic unsaturated group; $Y^1$ is a substituted or unsubstituted $C_{1-40}$ hydrocarbyl group; and $Z^1$ is a linking group linking $X^1$ and $Y^1$.

16 Claims, 1 Drawing Sheet

(51) Int. Cl.
| | |
|---|---|
| *C08G 77/442* | (2006.01) |
| *C10M 169/04* | (2006.01) |
| *C10N 20/04* | (2006.01) |
| *C10N 30/18* | (2006.01) |
| *C10N 40/04* | (2006.01) |
| *C10N 40/25* | (2006.01) |

(52) U.S. Cl.
CPC .. *C10M 169/041* (2013.01); *C10M 2203/003* (2013.01); *C10M 2229/048* (2013.01); *C10N 2020/04* (2013.01); *C10N 2030/18* (2013.01); *C10N 2040/04* (2013.01); *C10N 2040/25* (2013.01)

(58) Field of Classification Search
CPC ............ C10N 2030/18; C10N 2020/04; C10N 2040/04; C10N 2040/25; C08G 77/442; B01D 19/0409
See application file for complete search history.

(56) References Cited

U.S. PATENT DOCUMENTS

| | | | | |
|---|---|---|---|---|
| 5,766,513 | A * | 6/1998 | Pillon | B01D 19/0404 252/78.3 |
| 8,524,849 | B2 * | 9/2013 | Stark | C08F 2/04 528/32 |
| 2008/0707825 | | 8/2008 | Stark | |
| 2009/0116808 | A1 | 5/2009 | Kyota et al. | |
| 2011/0163254 | A1 | 7/2011 | Stark | |
| 2011/0287206 | A1 | 11/2011 | Suwa et al. | |
| 2013/0244917 | A1 | 9/2013 | Obrecht et al. | |
| 2014/0018267 | A1 | 1/2014 | Loop et al. | |
| 2014/0045053 | A1 | 2/2014 | Ichikawa et al. | |
| 2015/0218482 | A1 | 6/2015 | Ito et al. | |
| 2016/0281019 | A1 | 9/2016 | Deklippel | |
| 2018/0208870 | A1 | 7/2018 | Takagi et al. | |
| 2018/0208871 | A1 | 7/2018 | Takagi et al. | |
| 2018/0223219 | A1 | 8/2018 | Takagi et al. | |
| 2019/0256790 | A1 | 8/2019 | Takagi et al. | |

FOREIGN PATENT DOCUMENTS

| | | |
|---|---|---|
| CN | 1066662 A | 12/1992 |
| CN | 101263182 | 9/2008 |
| EP | 0 383 310 A2 | 8/1990 |
| EP | 0632157 | 1/1995 |
| EP | 0 632 060 A2 | 7/1995 |
| EP | 1182236 | 2/2001 |
| EP | 2617745 | 7/2013 |
| JP | 05-228306 | 9/1993 |
| JP | 8-126801 | 5/1996 |
| JP | 11-209778 | 8/1999 |
| JP | 2000-087065 | 3/2000 |
| JP | 2002-066206 | 3/2002 |
| JP | 2002-301306 | 10/2002 |
| JP | 2008-120889 | 5/2008 |
| JP | 2008-542462 | 11/2008 |
| JP | 2009-235252 | 10/2009 |
| JP | 2010-116493 | 5/2010 |
| JP | 2012-046762 | 3/2012 |
| JP | 2012-146762 | 3/2012 |
| JP | 2014-177608 | 9/2014 |
| JP | 2016-016367 | 2/2016 |
| WO | 2008/025718 | 3/2008 |
| WO | 2008-046862 | 4/2008 |
| WO | 2008/055998 | 5/2008 |
| WO | 2017/030201 | 2/2017 |
| WO | 2017/030203 | 2/2017 |

OTHER PUBLICATIONS

NOA issued in U.S. Appl. No. 15/749,875 dated Jan. 2, 2020.
ISR of PCT/JP2016/074295 dated Nov. 1, 2016.
IPRP of PCT/JP2016/074295 dated Feb. 20, 2018.
ISR of PCT/JP2016/074297 dated Nov. 1, 2016.
IPRP of PCT/JP2016/074297 dated Feb. 20, 2018.
ISR of PCT/JP2016/074298 dated Nov. 22, 2016.
IPRP of PCT/JP2016/074298 dated Feb. 20, 2018.
ISR of PCT/JP2016/074296 dated Nov. 1, 2016.
IPRP of PCT/JP2016/074296 dated Feb. 20, 2018.
ISR of PCT/JP2018/006536 dated May 1, 2018.
IPRP of PCT/JP2018/006536 dated Aug. 27, 2019.
US OA issued in U.S. Appl. No. 15/749,875 dated Aug. 19, 2019.
US OA issued in U.S. Appl. No. 15/749,919 dated Aug. 16, 2019.
US OA issued in U.S. Appl. No. 15/749,912 dated Sep. 25, 2019.
US OA issued in U.S. Appl. No. 15/749,904 dated Oct. 11, 2019.
NOA issued in U.S. Appl. No. 15/749,904 dated Mar. 25, 2020.

* cited by examiner

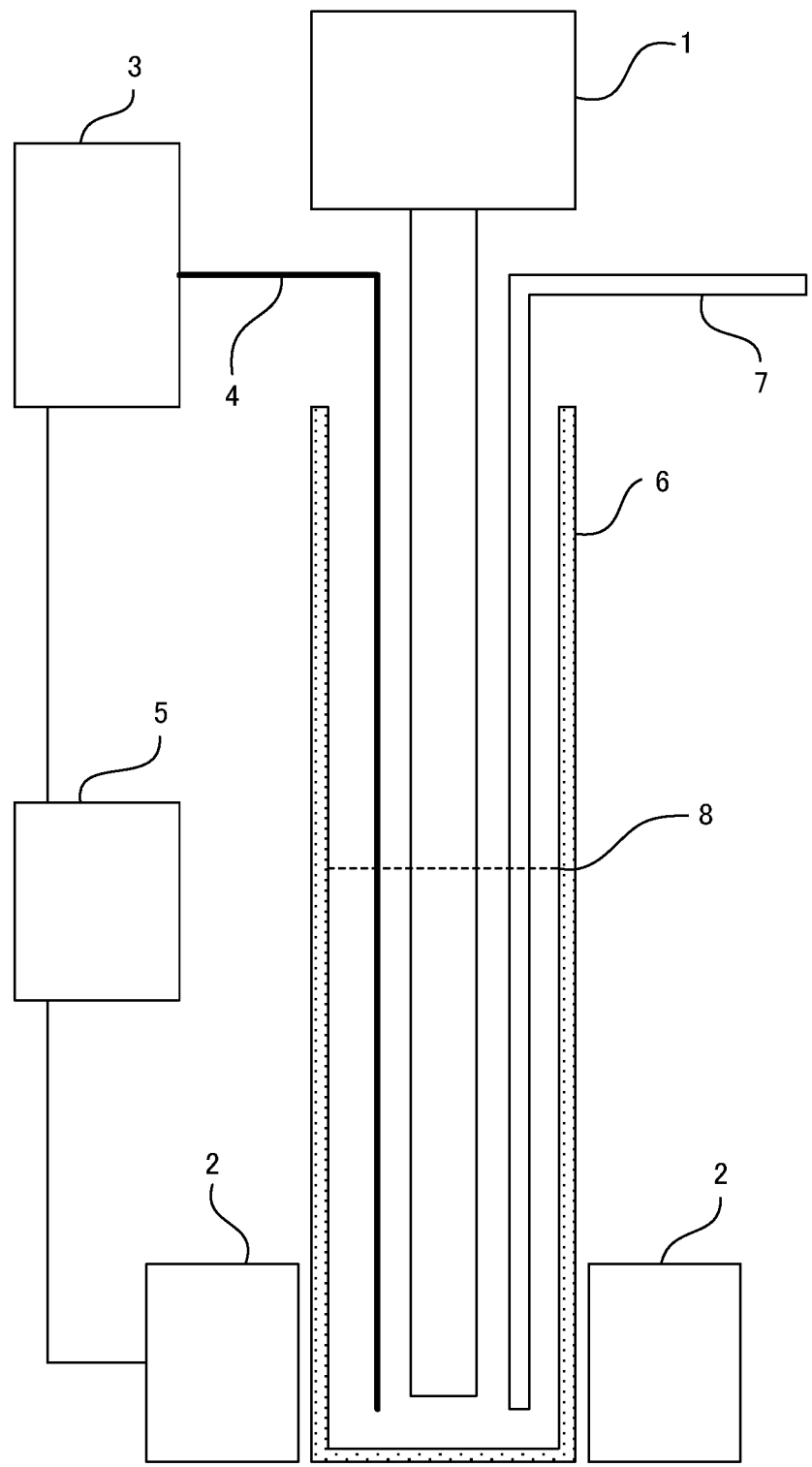

DEFOAMING AGENT AND LUBRICATING OIL COMPOSITION

FIELD

The present invention relates to defoaming agents, and lubricating oil compositions containing the defoaming agents.

BACKGROUND

Lubricating oil is used in various kinds of machinery so as to improve lubricity between members. Increase of foaming of the lubricating oil may lead to insufficient lubrication, failure to control hydraulic pressure, deteriorated cooling efficiency, and so on. Thus, suppressing foaming is required in the lubricating oil.

For example, automobile engines, transmissions, and axle units are demanding increasingly more from lubricating oil, accompanying their recent improvements in performance and fuel efficiency Continuous high-load operation or high-speed driving increases foaming in engine oil, transmission oil, or axle unit oil, and as a result, leads to problems such as: failure to control hydraulic pressure due to incorporation of foam in hydraulic circuits; deteriorated lubricating performance or cooling efficiency due to foaming; wear and seizure due to breakage of oil films in friction portions; and promoted deterioration of lubricating oil due to oil temperature increase. Thus, there is demand for engine oil, transmission oil, and axle unit oil which can maintain high defoaming performance so as to suppress foaming for a long time from the initial stage of use.

Generally, lubricating oil contains base oil, and various additives incorporated according to desired characteristics. Examples of additives include deforming agents to prevent foaming of lubricating oil. Polysiloxane defoaming agents (silicone defoaming agents) are conventionally known as defoaming agents. For example, Patent Literature 1 describes a lubricating oil composition formed by incorporating (a) polydimethylsiloxane having kinematic viscosity at 25° C. of 300,000 to 1,500,000 mm²/s, and (b) fluorinated polysiloxane having kinematic viscosity at 25° C. of 500 to 9,000 mm²/s. Patent Literature 2 discloses incorporating polydimethylsiloxane having a specific molecular weight distribution into lubricating oil to obtain defoaming effect on foam generated due to high-speed stirring.

CITATION LIST

Patent Literature

Patent Literature 1: JP 2000-87065 A
Patent Literature 2: JP 2008-120889 A

SUMMARY

Technical Problem

Conventional lubricating oil containing a silicone defoaming agent compound is liable to suffer precipitation and unevenness of a silicone defoaming agent in concentration during long-term storage in bottles or long-term use in machinery, which leads to gradual loss of defoaming effect in course of time, which results in increased foaming of the lubricating oil. For example, torque converters included in automatic transmissions, pulleys included in metal belt-type continuously variable transmissions, etc. have positions where very large centrifugal effect occurs. When the lubricating oil is supplied to such a position, a silicone defoaming agent compound is separated by such centrifugal effect, and concentrates in a specific position of the machinery, which leads to decreased concentration of the defoaming agent in the lubricating oil circulating in the machinery, and thus to increased foaming of the lubricating oil.

Disadvantageously, conventional lubricating oil containing a silicone defoaming agent compound also suffers deteriorated defoaming performance in course of time of use when high-load operation or high-speed driving continues. For example, lubricating oil is subjected to high shear stress on a lubrication position inside an engine, an automatic transmission, an axle unit, etc. (such as a sliding part between a piston and a cylinder, a valve train, a high-speed rotation bearing, a belt-pulley, and a gear). Molecules of a silicone defoaming agent compound incorporated in the lubricating oil are cut due to high shear stress, which results in decrease of its molecular weight. As a result, defoaming performance of the lubricating oil deteriorates in the endurance stage, which may lead to failure to maintain sufficient defoaming performance for a long term.

An object of the present invention is to provide a defoaming agent which can suppress deterioration of defoaming performance even during long-term storage, and can maintain deforming performance of lubricating oil for a long term even under such lubricating conditions that the lubricating oil is subjected to high centrifugal effect and high shear stress. The present invention also provides a lubricating oil composition comprising the defoaming agent.

Solution to Problem

The present invention encompasses the following embodiments [1] to [27]:

[1] A defoaming agent comprising a polymer, the polymer comprising: at least one first polymer chain comprising a polysiloxane structure, the polysiloxane structure being represented by the following general formula (1) and having a polymerization degree of 5 to 2000; and at least one second polymer chain comprising a repeating unit, the repeating unit being represented by the following general formula (2), the second polymer chain being bonded to the first polymer chain:

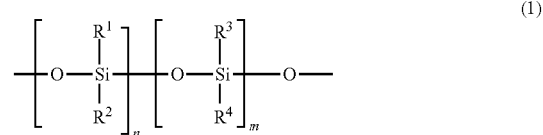

wherein in the general formula (1), polysiloxane repeating units may be in any order; each of $R^1$ and $R^2$ is independently a $C_{1-18}$ organic group comprising no fluorine atom; each of $R^3$ and $R^4$ is independently a $C_{1-18}$ organic group comprising no less than 3 fluorine atoms or a $C_{1-18}$ organic group comprising no fluorine atom, wherein at least one of $R^3$ and $R^4$ is the organic group comprising no less than 3 fluorine atoms; n is an integer of no less than 0; m is an integer of no less than 1; and n+m is 5 to 2000,

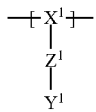
(2)

wherein in the general formula (2), $X^1$ is a repeating unit obtainable by polymerization of an ethylenic unsaturated group; $Y^1$ is a side chain consisting of a substituted or unsubstituted $C_{1-40}$ hydrocarbyl group; and $Z^1$ is a linking group linking the repeating unit $X^1$ and the side chain $Y^1$.

[2] The defoaming agent according to [1], wherein $X^1$ is a repeating unit obtainable by polymerization of (meth)acryloyl group.

[3] The defoaming agent according to [1] or [2], wherein the at least one second polymer chain is bonded to one end or both ends of the first polymer chain.

[4] The defoaming agent according to any one of [1] to [3], wherein the first polymer chain is represented by any one of the following general formulae (3) to (6):

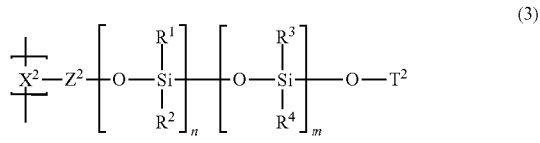
(3)

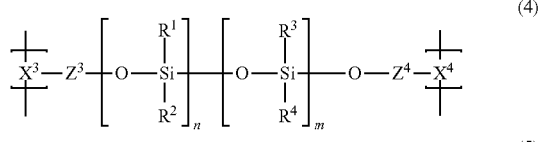
(4)

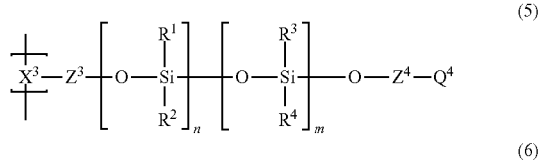
(5)

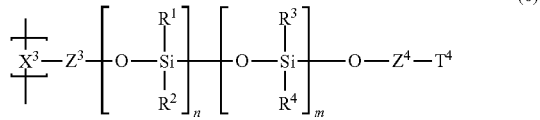
(6)

wherein in the general formulae (3) to (6), polysiloxane repeating units may be in any order; $R^1$, $R^2$, $R^3$, $R^4$, n and m are as previously defined; each of $X^2$, $X^3$, and $X^4$ is independently a repeating unit obtainable by polymerization of an ethylenic unsaturated group; $T^2$ is a non-polymerizable organic group; $Q^4$ is a polymerizable functional group giving the repeating unit $X^4$ upon polymerization; $T^4$ is an organic group derived from the polymerizable functional group $Q^4$ by a reaction other than polymer chain elongation; $Z^2$ is a linking group linking the repeating unit $X^2$ and a polysiloxane moiety; $Z^3$ is a linking group linking the repeating unit $X^3$ and a polysiloxane moiety; and $Z^4$ is a linking group linking the repeating unit $X^4$, the polymerizable functional group $Q^4$, or the organic group $T^4$ and a polysiloxane moiety.

[5] The defoaming agent according to [4], wherein $X^2$, $X^3$ and $X^4$ are repeating units obtainable by polymerization of (meth)acryloyl group.

[6] The defoaming agent according to any one of [1] to [5], wherein the at least one second polymer chain is bonded to only one end of the first polymer chain.

[7] The defoaming agent according to any one of [1] to [5], wherein the at least one second polymer chain is bonded to both ends of at least one of the first polymer chain.

[8] The defoaming agent according to any one of [1] to [7], wherein a ratio of a total number of polysiloxane repeating units comprising fluorine atoms to a total number of all polysiloxane repeating units is 0.01 to 1.

[9] The defoaming agent according to any one of [1] to [8], wherein a content of the first polymer chain is 0.5 to 80 mass % on the basis of the total mass of the polymer.

[10] The defoaming agent according to any one of [1] to [9], wherein the polymer has a weight average molecular weight of 10,000 to 1,000,000.

[11] The defoaming agent according to any one of [1] to [10], wherein the first polymer chain has a weight average molecular weight of 500 to 500,000.

[12] A defoaming agent comprising: a polymer obtainable by copolymerization of a first component and a second component; the first component being at least one polysiloxane macromonomer selected from compounds represented by the following general formula (7) or (8); and the second component being at least one monomer represented by the following general formula (9):

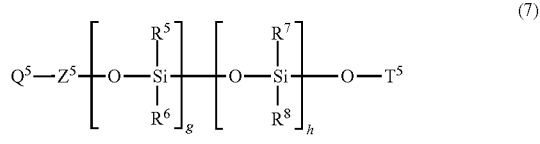
(7)

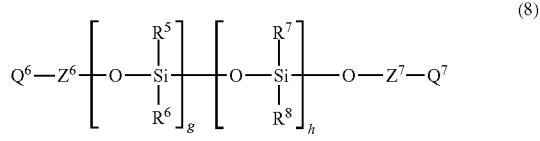
(8)

wherein in the general formulae (7) and (8), polysiloxane repeating units may be in any order; each of $R^5$ and $R^6$ is independently a $C_{1-18}$ organic group comprising no fluorine atom; each of $R^7$ and $R^8$ is independently an organic group comprising no less than 3 fluorine atoms or a $C_{1-18}$ organic group comprising no fluorine atom, wherein at least one of $R^7$ and $R^8$ is the organic group comprising no less than 3 fluorine atoms; each of $Q^5$, $Q^6$, and $Q^7$ is independently a polymerizable functional group comprising an ethylenic unsaturated group; $Z^5$ is a linking group linking the polymerizable functional group $Q^5$ and a polysiloxane moiety; $Z^6$ is a linking group linking the polymerizable functional group $Q^6$ and a polysiloxane moiety; $Z^7$ is a linking group linking the polymerizable functional group $Q^7$ and a polysiloxane moiety; $T^5$ is a non-polymerizable organic group; g is an integer of no less than 0; h is an integer of no less than 1; and g+h is 5 to 2000, $$Q^8\text{-}Z^8—Y^8 \qquad (9)$$

wherein in the general formula (9), $Q^8$ is a polymerizable functional group comprising an ethylenic unsaturated group; $Y^8$ is a substituted or unsubstituted $C_{1-40}$ hydrocarbyl group; and $Z^8$ is a linking group linking $Q^8$ and $Y^8$.

[13] The defoaming agent according to [12], wherein in the first component, a ratio of a total number of polysiloxane repeating units comprising fluorine atoms to a total number of all polysiloxane repeating units is 0.01 to 1.

[14] The defoaming agent according to [12] or [13], wherein an amount of the first component in the copolymerization is 0.5 to 80 parts by mass on the basis of the total amount of the first component and the second component as 100 parts by mass.

[15] The defoaming agent according to any one of [12] to [14], wherein $Q^5$, $Q^6$, and $Q^7$ comprise (meth)acryloyl group.

[16] The defoaming agent according to any one of [12] to [15], wherein the polymer has a weight average molecular weight of 10,000 to 1,000,000.

[17] The defoaming agent according to any one of [12] to [16], wherein the first component has a weight average molecular weight of 500 to 500,000.

[18] A defoaming agent obtainable by polymerization of (B) at least one defoaming agent monomer comprising at least one polysiloxane macromonomer selected from the compounds represented by the following general formula (10) or (11) in (A) a polymerization solvent in the presence of (C) a polymer soluble in the polymerization solvent.

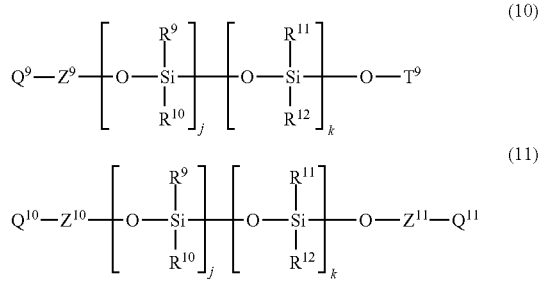

wherein in the general formulae (10) and (11), polysiloxane repeating units may be in any order; each of $R^9$ and $R^{10}$ is independently a $C_{1-18}$ organic group comprising no fluorine atom; each of $R^{11}$ and $R^{12}$ is independently an organic group comprising no less than 3 fluorine atoms or a $C_{1-18}$ organic group comprising no fluorine atom, wherein at least one of $R^{11}$ and $R^{12}$ is the organic group comprising no less than 3 fluorine atoms; each of $Q^9$, $Q^{10}$, and $Q^{11}$ is independently a polymerizable functional group comprising an ethylenic unsaturated group; $Z^9$ is a linking group linking the polymerizable functional group $Q^9$ and a polysiloxane moiety; $Z^{10}$ is a linking group linking the polymerizable functional group $Q^{10}$ and a polysiloxane moiety; $Z^{11}$ is a linking group linking the polymerizable functional group $Q^{11}$ and a polysiloxane moiety; $T^9$ is a non-polymerizable organic group; j is an integer of no less than 0; k is an integer of no less than 1; and j+k is 5 to 2000.

[19] The defoaming agent according to [18], wherein, in the component (B), a ratio of a total number of polysiloxane repeating units comprising fluorine atoms to a total number of all polysiloxane repeating units is 0.01 to 1.

[20] The defoaming agent according to [18] or [19], wherein the component (B) has a weight average molecular weight of 500 to 500,000.

[21] The defoaming agent according to any one of [18] to [20], wherein the polymerization is dispersion polymerization; and the (C) polymer soluble in the polymerization solvent is (C1) a polymer dispersant.

[22] The defoaming agent according to [21], wherein the (A) polymerization solvent comprises at least one selected from: a hydrocarbon solvent having 6 or more carbons, a mineral oil, a synthetic oil, and an ester oil.

[23] The defoaming agent according to [21] or [22], wherein the (C1) polymer dispersant comprises a polyalkyl (meth)acrylate having a weight average molecular weight of 10,000 to 1,000,000.

[24] The defoaming agent according to any one of [18] to [20], wherein the polymerization is solution polymerization.

[25] The defoaming agent according to [24], wherein the (C) polymer soluble in the polymerization solvent comprises a polyalkyl (meth)acrylate having a weight average molecular weight of 10,000 to 1,000,000.

[26] A lubricating oil composition comprising: a lubricating base oil; and the defoaming agent as in any one of [1] to [25], in an amount of 1 to 500 mass ppm in terms of silicon on the basis of the total mass of the composition.

[27] The lubricating oil composition according to [26], which is a lubricating oil for an automobile engine, an automobile transmission, or an automobile transaxle unit.

In the present description, "(meth)acrylate" means "acrylate and/or methacrylate", and "(meth)acryl" means "acryl and/or methacryl".

Advantageous Effects of Invention

The defoaming agent and lubricating oil composition of the present invention can suppress deterioration of defoaming performance even during long-term storage, and can maintain deforming performance of lubricating oil for a long term even under such lubricating conditions that the lubricating oil is subjected to high centrifugal effect and high shear stress.

BRIEF DESCRIPTION OF DRAWINGS

FIG. 1 is an explanatory view of the structure of a homogenizer test machine that is used for the evaluation of defoaming performance.

DETAILED DESCRIPTION OF EMBODIMENTS

The present invention will be described hereinafter. Expression "A to B" concerning numeral ranges means "no less than A and no more than B" unless otherwise specified. In such expression, if a unit is added only to the numeral value B, the same unit is applied to the numeral value A.

<1. Defoaming Agent (1)>

The defoaming agent according to the first aspect of the present invention comprises a polymer, the polymer comprising: at least one first polymer chain comprising a polysiloxane structure, the polysiloxane structure being represented by the following general formula (1) and having a polymerization degree of 5 to 2000; and at least one second polymer chain comprising a repeating unit, the repeating unit being represented by the following general formula (2), the second polymer chain being bonded to the first polymer chain:

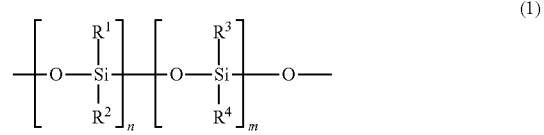

wherein in the general formula (1), polysiloxane repeating units may be in any order;

each of $R^1$ and $R^2$ is independently a $C_{1\text{-}18}$ organic group comprising no fluorine atom;

each of $R^3$ and $R^4$ is independently a $C_{1\text{-}18}$ organic group comprising no less than 3 fluorine atoms or a 0-18 organic group comprising no fluorine atom, wherein at least one of $R^3$ and $R^4$ is the organic group comprising no less than 3 fluorine atoms;

n is an integer of no less than 0;

m is an integer of no less than 1; and n+m is 5 to 2000,

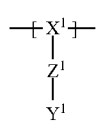

(2)

wherein in the general formula (2), $X^1$ is a repeating unit obtainable by polymerization of an ethylenic unsaturated group; $Y^1$ is a side chain consisting of a substituted or unsubstituted $C_{1\text{-}40}$ hydrocarbyl group; and $Z^1$ is a linking group linking the repeating unit $X^1$ and the side chain $Y^1$.

(Second Polymer Chain)

For the sake of convenience, the second polymer chain will be described before the first polymer chain is described. In the second polymer chain, $X^1$ may be a combination of two or more repeating units, $Y^1$ may be a combination of two or more side chains, and $Z^1$ may be a combination of two or more linking groups.

The linking group $Z^1$ is not specifically limited as long as being able to link the repeating unit (main chain skeleton) $X^1$ and the side chain $Y^1$. Preferable examples of $Z^1$ include linking groups having an ester bond, an amide bond, an ether bond, a thioether bond, a thioester bond, a thionoester bond, a thioamide bond, or an imide bond. The linking group $Z^1$ may comprise one or more groups selected from a straight or branched chain alkyl or alkylene group, an alicyclic group, and an aromatic group, in addition to those chemical bonds. The carbon number of the linking group $Z^1$ is not specifically limited, but is no less than 0, preferably no more than 12, and more preferably no more than 6.

$Y^1$ is a side chain consisting of a $C_{1\text{-}40}$ substituted or unsubstituted hydrocarbyl group. Specific examples of a $C_{1\text{-}40}$ unsubstituted hydrocarbyl group include: an alkyl group (that may have a ring structure), an alkenyl group (that may have a double bond in any position, and may have a ring structure), an aryl group (that may have an alkyl or alkenyl group), an arylalkyl group, and an arylalkenyl group.

Examples of an alkyl group include various straight or branched alkyl groups. Examples of a ring structure that an alkyl group may have include: cycloalkyl groups having 5 to 7 carbon atoms such as cyclopentyl group, cyclohexyl group, and cycloheptyl group. A chain hydrocarbyl substituent, if any, may be in any position on the ring structure.

Examples of an alkenyl group include various straight or branched alkenyl groups. Examples of a ring structure that an alkenyl group may have include the above described cycloalkyl group, and cycloalkenyl group having 5 to 7 carbon atoms such as cyclopentenyl group, cyclohexenyl group, and cycloheptenyl group. A chain hydrocarbyl substituent, if any, may be in any position on the ring structure.

Examples of an aryl group include phenyl group and naphthyl group. In an alkylaryl group, an alkenylaryl group, an arylalkyl group, and an arylalkenyl group, a substituent may be in any position on an aromatic ring.

The unsubstituted hydrocarbyl group as $Y^1$ is preferably an aliphatic hydrocarbyl group, more preferably a chain aliphatic hydrocarbyl group, and especially preferably an alkyl group.

$Y^1$ may be an unsubstituted hydrocarbyl group, or may be a substituted hydrocarbyl group, or may be a combination of unsubstituted and substituted hydrocarbyl groups. Preferred examples of the substituted hydrocarbyl group as $Y^1$ include groups obtained by substituting a hydrogen atom(s) of an unsubstituted hydrocarbyl group (preferably an aliphatic hydrocarbyl group, more preferably a chain aliphatic hydrocarbyl group, and especially preferably an alkyl group. The same will be applied in this paragraph) with a heteroatom-containing group(s) (the heteroatom is preferably oxygen, nitrogen, sulfur, or any combination thereof); substituting a methylene group(s) (—CH$_2$— group) of the unsubstituted hydrocarbyl group with an ether bond(s) (—O— group), a secondary amino group(s) (—NH— group), or a thioether bond(s) (—S— group); substituting a methine group(s) (>CH— group) of the unsubstituted hydrocarbyl group with a tertiary amino group(s) (>N— group); or any combination of those substitutions. The number of heteroatoms contained in such an embodiment of $Y^1$ is preferably 1 to 3. Other preferred examples of the substituted hydrocarbyl group as $Y^1$ include polyether groups, fluoroalkyl groups, and fluoroalkyl (poly)ether groups.

Preferred examples of the heteroatom-containing groups include: hydroxy group; mercapto group; primary amino group; amine residues having 1 to 2 nitrogen atoms and 0 to 2 oxygen atoms such as dimethylamino group, diethylamino group, dipropylamino group, dibutylamino group, anilino group, toluidino group, xylidino group, acetylamino group, and benzoylamino group; heterocyclic residues having 1 to 2 nitrogen atoms and 0 to 2 oxygen atoms such as morpholino group, pyrrolyl group, pyrrolino group, pyridyl group, methylpyridyl group, pyrrolidinyl group, piperidinyl group, piperidino group, quinolyl group, pyrrolidonyl group, pyrrolidono group, imiazolino group, and pyrazinyl group; and $C_{2\text{-}5}$ cyclic ether residues such as epoxy group, oxetanyl group, tetrahydrofuranyl group, and tetrahydropyranyl group.

Preferred examples of the polyether group include the groups represented by the following general formula (12):

(12)

wherein in the general formula (12), $R^{13}$ is a $C_{2\text{-}4}$, preferably $C_{2\text{-}3}$ alkylene group, a plurality of $R^{13}$ may be the same, or may be different from each other; a is an integer of no less than 2 and makes the carbon number in the general formula (12) no more than 40; and $R^{14}$ is hydrogen or a $C_{1\text{-}5}$ alkyl group.

Preferred examples of the fluoroalkyl group include: a $C_{1\text{-}4}$ perfluoroalkyl group; the groups represented by the following general formula (13); the groups represented by the following general formula (14); 1,1,1,3,3,3-hexafluoro-2-propyl group; 2,2-bis(trifluoromethyl)propyl group; perfluorocyclohexylmethyl group; pentafluorobenzyl group; 2,3,5,6-tetrafluorophenyl group; 2,2,2-trifluoro-1-phenyl-1-(trifluoromethyl)ethyl group; and 3-(trifluoromethyl)benzyl group:

(13)

wherein in the formula (13), E is a fluorine atom or hydrogen atom; p is an integer of 1 to 6; q is an integer of 1 to 15; and when q is 1, E is a fluorine atom.

In the general formula (13), q is preferably no less than 2, and preferably no more than 8. q of this lower limit or over leads to improved defoaming performance. q of this upper limit or below makes it easy to avoid decrease of defoaming performance induced by solidification of the polymer.

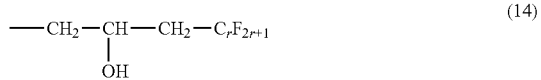

(14)

wherein in the formula (14), r is an integer of 2 to 9.

In the general formula (14), r is preferably no less than 4, and preferably no more than 8. r of this lower limit or over leads to improved defoaming performance. r of this upper limit or below makes it easy to avoid decrease of defoaming performance induced by solidification of the polymer.

Examples of the $C_{1-4}$ perfluoroalkyl group include: trifluoromethyl group, perfluoroethyl group, perfluoropropyl group, perfluoroisopropyl group, and perfluoro-tert-butyl group.

Examples of the groups represented by the general formula (13) include: 2,2,2-trifluoroethyl group; 1H,1H,3H-hexafluorobutyl group; 2-(perfluorobutyl)ethyl group; 3-(perfluorobutyl)propyl group; 6-(perfluorobutyl)hexyl group; 2-(perfluoro-5-methylhexyl)ethyl group; 2-(perfluoro-7-methyloctyl)ethyl group; 4,4,5,5,5-pentafluoropentyl group; 2-(perfluorohexyl)ethyl group; 2-(perfluorooctyl)ethyl group; 3-(perfluorohexyl)propyl group; 3-(perfluorooctyl)propyl group; 1H,1H,3H-tetrafluoropropyl group; 1H,1H,5H-octafluoropentyl group; 1H,1H,7H-dodecafluoroheptyl group; 1H,1H,9H-hexadecafluorononyl group; 6-(perfluoro-1-methylethyl)hexyl group; 1H,1H-(3,5,5-tris(trifluoromethyl))octafluorohexyl group; 1H,1H,11H-eicosafluoroundecyl group; 2-(perfluoro-3-methylbutyl)ethyl group; 1H,1H-perfluoropropyl group; 1H,1H-perfluorobutyl group; 1H,1H-perfluoropentyl group; 1H,1H-perfluorohexyl group; 1H,1H-perfluoroheptyl group; 1H,1H-perfluorooctyl group; 1H,1H-perfluorononyl group; 1H,1H-perfluorodecyl group; 1H,1H-perfluoroundecyl group; 1H,1H-perfluorododecyl group; 1H,1H-perfluorotetradecyl group; 1H,1H-perfluorohexadecyl group; 1H,1H-perfluoro-3,7-dimethyloctyl group; 2-(perfluorodecyl)ethyl group; 2-(perfluorododecyl)ethyl group; and 2-(perfluoro-9-methyldecyl)ethyl group.

Examples of the groups represented by the general formula (14) include: 3-(perfluorobutyl)-2-hydroxypropyl group; 3-(perfluoro-3-methylbutyl)-2-hydroxypropyl group; 3-(perfluorooctyl)-2-hydroxypropyl group; 3-(perfluoro-5-methylhexyl)-2-hydroxypropyl group; and 3-(perfluoro-7-methyloctyl)-2-hydroxypropyl group.

Preferred examples of the fluoroalkyl (poly)ether groups include: the groups represented by the following general formula (15); 2-[(perfluoropropanoyl)oxy]ethyl group; and fluoropolyether groups comprising a perfluoropolyethylene oxide group, a perfluoropolypropylene oxide group, or a perfluoropolyoxetane group, and fluoropolyether copolymer groups thereof:

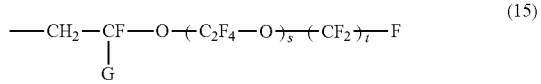

(15)

wherein in the formula (15), G is a fluorine atom or a trifluoromethyl group; s is an integer of 0 to 2; and t is an integer of 1 to 4.

Examples of the groups represented by the general formula (15) include: 1H,1H-perfluoro-3,6-dioxadecyl group; 1H,1H-perfluoro-3,6,9-trioxadecyl group; 1H,1H-perfluoro-3,6,9-trioxadecyl group; 2-perfluoropropoxy-2,3,3,3-tetrafluoropropyl group; and 1H,1H-perfluoro-2,5-dimethyl-3,6-dioxanonyl group.

Among the above description, any group represented by the general formula (13) may be especially preferably employed as the substituted hydrocarbyl group having a fluorine atom.

The ratio (hereinafter may be referred to as "average functionalization ratio") of the total number of $Y^1$ being a substituted hydrocarbyl group(s) to the total number of $Y^1$ in the polymer is usually 0 to 0.5, preferably no more than 0.3, more preferably no more than 0.1, and in one embodiment may be 0. When the average functionalization ratio of the hydrocarbyl group $Y^1$ is over this upper limit, the lifetime of the defoaming agent tends to decrease because of precipitation of the defoaming agent.

The carbon number of $Y^1$ is 1 to 40, preferably no less than 8, more preferably no less than 12, preferably no more than 36, more preferably no more than 24, and especially preferably no more than 18.

(First Polymer Chain)

In the first polymer chain, polysiloxane repeating units may be arranged in any order. In the general formula (1), when both n and m are no less than 1, the polysiloxane structure may be a random copolymer, or may be an alternating copolymer, or may be a block copolymer.

In the first polymer chain, the polymerization degree of the polysiloxane structure (n+m) is 5 to 2000, preferably no less than 50, more preferably no less than 100, preferably no more than 1500, and more preferably no more than 1000. The polymerization degree of the polysiloxane structure of this lower limit or over makes it possible to improve defoaming performance of the defoaming agent. When the polymerization degree of the polysiloxane structure is over this upper limit, the lifetime of the defoaming agent tends to decrease because of precipitation of the defoaming agent.

In the defoaming agent according to the first aspect of the present invention, the ratio (hereinafter may be simply referred to as "average fluorination ratio of the polysiloxane structure") of the total number of polysiloxane repeating units comprising fluorine atoms ($—O—SiR^3R^4—$) to the total number of all polysiloxane repeating units ($—O—SiR^1R^2—$ repeating unit and $—O—SiR^3R^4—$ repeating unit: see the general formula (1)) is usually no less than 0.01, preferably no less than 0.05, and more preferably no less than 0.10, and may even be 1, and is, in one embodiment, preferably no more than 0.99, more preferably no more than 0.90, and especially preferably no more than 0.75. The average fluorination ratio of the polysiloxane structure of this lower limit or over makes it possible to improve defoaming performance after shearing. The average fluorination ratio of the polysiloxane structure of this preferred upper limit or below makes it easy to suppress decrease of the lifetime of the defoaming agent induced by precipitation of the defoaming agent.

In the general formula (1), examples of the $C_{1-18}$ organic group comprising no fluorine atom include: substituted or unsubstituted alkyl groups, substituted or unsubstituted phenyl groups, and polyether groups. Examples of substituents in the substituted alkyl groups and substituted phenyl groups include: hydroxy group, amino group, ether bond, and ester bond. The carbon number of the organic group is 1 to 18, and in one embodiment 1 to 12, and in another embodiment 1 to 6. Preferred examples of the organic group include: methyl group, and phenyl group. Among them, methyl group may be especially preferably employed.

In the general formula (1), a fluoroalkyl group or a fluoroalkyl (poly)ether group may be preferably employed as the organic group comprising no less than 3 fluorine atoms (hereinafter may be referred to as "fluorinated organic group").

The number of fluorine atoms in the fluorinated organic group is no less than 3, preferably no less than 5, and preferably no more than 17. The number of fluorine atoms of this lower limit or over leads to improved defoaming performance. The number of fluorine atoms in the fluorinated organic group of this upper limit or below makes it easy to avoid decrease of defoaming performance induced by solidification of the polymer.

The same group as that of the fluoroalkyl group described above concerning $Y^1$ in the general formula (2) may be employed as the fluoroalkyl group, and preferred embodiments thereof are also the same as described above. The same group as that of the fluoroalkyl (poly)ether group described above concerning $Y^1$ in the general formula (2) may be employed as the fluoroalkyl (poly)ether group, and preferred embodiments thereof are also the same as described above.

Among the above description, any group represented by the general formula (13) may be especially preferably employed as the fluorinated organic group.

In one embodiment, the second polymer chain may be bonded to one end or both ends of the first polymer chain. In one embodiment, the first polymer chain is represented by any one of the following general formulae (3) to (6):

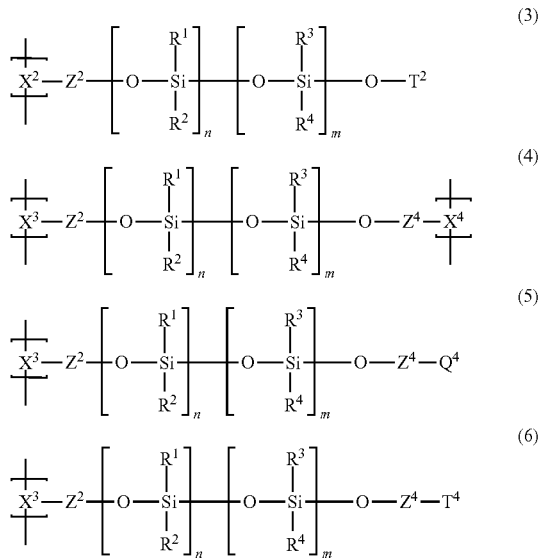

wherein in the general formulae (3) to (6), polysiloxane repeating units may be in any order;
$R^1$, $R^2$, $R^3$, $R^4$, n and m are as previously defined;
each of $X^2$, $X^3$, and $X^4$ is independently a repeating unit obtainable by polymerization of an ethylenic unsaturated group;
$T^2$ is a non-polymerizable organic group;
$Q^4$ is a polymerizable functional group giving the repeating unit $X^4$ upon polymerization;
$T^4$ is an organic group derived from the polymerizable functional group $Q^4$ by a reaction other than polymer chain elongation;

$Z^2$ is a linking group linking the repeating unit $X^2$ and a polysiloxane moiety;
$Z^3$ is a linking group linking the repeating unit $X^3$ and a polysiloxane moiety; and
$Z^4$ is a linking group linking the repeating unit $X^4$, the polymerizable functional group $Q^4$, or the organic group $T^4$ and a polysiloxane moiety.

In the general formulae (3) to (6), $X^2$, $X^3$ and $X^4$ may be each independently a combination of at least two repeating units. $Q^4$ may be a combination of at least two polymerizable functional groups correspondingly to $X^4$. $T^4$ may be a combination of at least two organic groups. $Z^2$, $Z^3$ and $Z^4$ may be each independently a combination of at least two linking groups.

In the general formulae (3) to (6), the repeating units $X^2$, $X^3$ and $X^4$ may be each independently bonded to the repeating unit $X^2$ of the second polymer chain (the general formula (2)), or may be each independently bonded to a repeating unit of another first polymer chain ($X^2$, $X^3$ or $X^4$). That is, in the general formulae (3) to (6), the first polymer chain may be bonded to the second polymer chain at $X^2$, $X^3$ or $X^4$.

As can be seen from the general formulae (3) to (6), at least one second polymer chain may be bonded to one end or both ends of the first polymer chain. In one embodiment, at least one second polymer chain may be bonded to only one end of the first polymer chain (the general formulae (3), (5) and (6)). In another embodiment, at least one second polymer chain may be bonded to both ends of at least one of the first polymer chain (the general formula (4)).

At a chain end of the first polymer chain, the chain end not being bonded to the second polymer chain, for example, an end of the polysiloxane chain may be bonded to (a) the non-polymerizable organic group $T^2$ as shown in the general formula (3), or may be bonded to (b) the polymerizable functional group $Q^4$ via the linking group $Z^4$ as shown in the general formula (5), or may be bonded to (c) the organic group $T^4$ derived from the polymerizable functional group $Q^4$ by a reaction other than polymer chain elongation via the linking group $Z^4$ as shown in the general formula (6).

In the general formula (3), $T^2$ may be, for example, the same group as any of $R^1$ to $R^4$, or may be, for example, a $C_{1-40}$ hydrocarbyl group, or may be a monovalent $C_{1-40}$ organic group having at least one functional group (such as hydroxy group, amino group, ether bond, ester bond, or amide bond), or may be a hydrogen atom.

In the general formulae (3) to (6), $X^2$ to $X^4$ are each independently a repeating unit obtainable by polymerization of an ethylenic unsaturated group. As described later, in one embodiment, $X^2$ to $X^4$ may be each independently a repeating unit obtainable by polymerization of (meth)acryloyl group.

In the general formula (5), $Q^4$ is a polymerizable functional group giving the repeating unit $X^4$ upon polymerization, that is, a functional group having a polymerizable ethylenic unsaturated group.

In the general formulae (3) to (6), the linking group $Z^2$ is not specifically limited as long as being able to link the polysiloxane structure and the repeating unit $X^2$. The linking group $Z^3$ is not specifically limited as long as being able to link the polysiloxane structure and the repeating unit $X^3$. The linking group $Z^4$ is not specifically limited as long as being able to link the polysiloxane structure and the repeating unit $X^4$ (or polymerizable functional group $Q^4$ or organic group $T^4$). The linking groups $Z^2$, $Z^3$ and $Z^4$ may be the same as or different from each other. Preferred examples of the linking groups $Z^2$ to $Z^4$ include linking groups having a carbonyl group, an ester bond, an amide bond, an ether bond, a thioether bond, a thioester bond, a thionoester bond, a thioamide bond, or an imide bond. The linking groups $Z^2$ to $Z^4$ may comprise one or more groups selected from a straight or branched chain alkyl or alkylene group, a saturated or aromatic dihydrocarbylsilylene group, an alicyclic group, an aromatic group, etc. in addition to those chemical bonds. In one embodiment, the linking groups $Z^2$ to $Z^4$ may have: a chain saturated or alicyclic saturated or aromatic dihydrocarbylsilylene group bonded to the polysiloxane structure; a straight or branched chain alkylene group bonded to the silylene group; and a bond linking the alkylene group and the repeating units $X^2$ to $X^4$ or polymerizable functional group $Q^4$ or organic group $T^4$ (such as an ester bond, an amide bond, an ether bond, a thioether bond, a thioester bond, a thionoester bond, a thioamide bond, or an imide bond; preferably an ester bond, an amide bond or a thioester bond). In another embodiment, the linking groups $Z^2$ to $Z^4$ may have: a straight or branched chain alkylene group bonded to the polysiloxane structure; and a bond linking the alkylene group and the repeating units $X^2$ to $X^4$ or polymerizable functional group $Q^4$ or organic group $T^4$ (such as an ester bond, an amide bond, an ether bond, a thioether bond, a thioester bond, a thionoester bond, a thioamide bond, or an imide bond; preferably an ester bond, an amide bond or a thioester bond). The carbon number of the linking groups $Z^2$ to $Z^4$ is not specifically limited, and is no less than 0, preferably no less than 1, and preferably no more than 30, and more preferably no more than 24.

In the general formula (6), $T^4$ is an organic group derived from the polymerizable functional group $Q^4$ by a reaction other than polymer chain elongation. As the reaction other than polymer chain elongation, reactions which can occur during polymerization reaction of ethylenic unsaturated groups and are other than polymer chain elongation are anticipated. Examples of such reactions include: a reaction in which a propagating radical, which has been formed by addition of a radical species other than the propagating radicals (such as primary radicals formed from polymerization initiators used in the polymerization reaction (such as azo polymerization initiators or peroxide polymerization initiators)) to the polymerizable ethylenic unsaturated group of $Q^4$, deactivates without experiencing elongation of a polymer chain (by, for example, termination by disproportionation, recombination with another primary radical, etc.); a reaction in which a propagating radical, which has been formed by chain transfer of another radical species and the polymerizable ethylenic unsaturated group of $Q^4$ (at the same time with deactivation of the other propagating radial), deactivates without experiencing elongation of a polymer chain; and chain transfer to a polymerization solvent.

The polymer has at least one first polymer chain and at least one second polymer chain bonded to the first polymer chain. The content of the first polymer chain in the polymer is, on the basis of the total mass of the polymer (100 mass %), preferably 0.5 to 80 mass %, more preferably no less than 1 mass %, further preferably no less than 2 mass %, especially preferably no less than 4 mass %, more preferably no more than 75 mass %, and especially preferably no more than 70 mass %. The content of the first polymer chain of this lower limit or more makes it possible to further improve defoaming performance. When the content of the first polymer chain is over this upper limit, the lifetime of the defoaming agent tends to decrease because of precipitation of the defoaming agent.

The content of the repeating units represented by the general formula (2) in the polymer is, on the basis of the total mass of the polymer (100 mass %), preferably 20 to 99.5 mass %, more preferably no less than 25 mass %, especially preferably no less than 30 mass %, and more preferably no more than 99 mass %, further preferably no more than 98 mass %, and especially preferably no more than 96 mass %. When the content of the repeating units represented by the general formula (2) is under this lower limit, the lifetime of the defoaming agent tends to decrease because of precipitation of the defoaming agent. The content of the repeating units represented by the general formula (2) of this upper limit or below makes it easy to further improve defoaming performance.

The polymer has a weight average molecular weight of preferably 10,000 to 1,000,000, more preferably no less than 12,000, further preferably no less than 14,000, especially preferably no less than 15,000, and more preferably no more than 500,000, further preferably no more than 300,000, and especially preferably no more than 200,000. Here, a weight average molecular weight means weight average molecular weight in terms of polystyrene which is measured by gel permeation chromatography (GPC) using polystyrene as a standard material. The weight average molecular weight of this lower limit or over makes it easy to improve defoaming performance. When the weight average molecular weight is over this upper limit, the lifetime of the defoaming agent tends to decrease because of precipitation of the defoaming agent.

The first polymer chain has a weight average molecular weight of preferably 500 to 500,000, more preferably no less than 5000, especially preferably no less than 10,000, more preferably no more than 250,000, especially preferably no more than 150,000, and most preferably no more than 100,000. The weight average molecular weight of the first polymer chain of this lower limit or over makes it possible to improve defoaming performance. When the weight average molecular weight of the first polymer chain is over this upper limit, the lifetime of the defoaming agent tends to decrease because of precipitation of the defoaming agent.

In one embodiment, the polymer can be obtained by, for example, copolymerizing a first component and a second component, the first component being at least one polysiloxane macromonomer selected from the compounds represented by the following general formula (7) or (8), and the second component being at least one monomer represented by the following general formula (9):

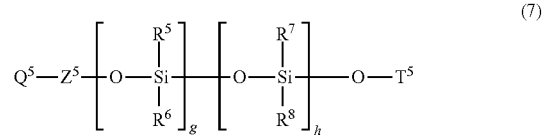

(7)

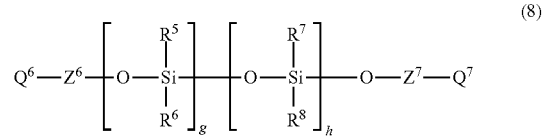

(8)

wherein in the general formulae (7) and (8), polysiloxane repeating units may be in any order;
each of $R^5$ and $R^6$ is independently a $C_{1-18}$ organic group comprising no fluorine atom;
each of $R^7$ and $R^8$ is independently an organic group comprising no less than 3 fluorine atoms or a $C_{1-18}$ organic group comprising no fluorine atom, wherein at least one of $R^7$ and $R^8$ is the organic group comprising no less than 3 fluorine atoms;

each of $Q^5$, $Q^6$, and $Q^7$ is independently a polymerizable functional group comprising an ethylenic unsaturated group;

$Z^5$ is a linking group linking the polymerizable functional group $Q^5$ and a polysiloxane moiety;

$Z^6$ is a linking group linking the polymerizable functional group $Q^6$ and a polysiloxane moiety;

$Z^7$ is a linking group linking the polymerizable functional group $Q^7$ and a polysiloxane moiety;

$T^5$ is a non-polymerizable organic group;

g is an integer of no less than 0;

h is an integer of no less than 1; and g+h is 5 to 2000,

$$Q^8\text{-}Z^8\text{—}Y^8 \tag{9}$$

wherein in the general formula (9), $Q^8$ is a polymerizable functional group comprising an ethylenic unsaturated group;

$Y^8$ is a substituted or unsubstituted $C_{1-40}$ hydrocarbyl group; and $Z^8$ is a linking group linking $Q^8$ and $Y^8$.

As a result of the copolymerization, the first component gives one first polymer chain per one molecule, and the second component gives the second polymer chain by polymerization of a plurality of monomer molecules (the general formula (9)). The compound represented by the general formula (7) gives the first polymer chain represented by the general formula (3), and the compound represented by the general formula (8) gives the first polymer chain represented by any one of the general formulae (4) to (6). As regards the first component, as the compound represented by the general formula (7), one may be used alone, or two or more may be used in combination. As the compound represented by the general formula (8), one may be used alone, or two or more may be used in combination. As the first component, the compound represented by the general formula (7) may be used alone, or the compound represented by the general formula (8) may be used alone, or the compounds represented by the general formulae (7) and (8) may be used in combination. As the second component, one monomer represented by the general formula (9) may be used alone, or two or more monomers represented by the general formula (9) may be used in combination.

In the general formulae (7) to (9), $Q^5$ to $Q^8$ may be each independently a combination of at least two polymerizable functional groups. In the general formulae (7) to (9), $Z^5$ to $Z^8$ may be each independently a combination of at least two linking groups. $T^5$ may be a combination of at least two organic groups. $Y^8$ may be a combination of at least two substituted or unsubstituted hydrocarbyl groups.

In the general formula (7), the same group as described above concerning $T^2$ in the general formula (3) may be employed as $T^5$, and preferred embodiments thereof are also the same as described above.

In the general formula (9), the same group as described above as the linking group $Z^1$ in the general formula (2) may be employed as the linking group $Z^8$, and preferred embodiments thereof are also the same as described above.

In the general formula (9), the same group as described above concerning the substituted or unsubstituted hydrocarbyl group as the side chain $Y^1$ in the general formula (2) may be employed as the substituted or unsubstituted hydrocarbyl group $Y^8$, and preferred embodiments thereof are also the same as described above.

In the general formulae (7) and (8), polysiloxane repeating units may be arranged in any order. In the general formulae (7) and (8), when both g and h are no less than 1, the polysiloxane structure may be a random copolymer, or may be an alternating copolymer, or may be a block copolymer.

In the general formulae (7) and (8), preferred embodiments of the polymerization degree of the polysiloxane structure (g+h) are the same as the polymerization degree of the polysiloxane structure (n+m: see the general formula (1)) described above concerning the first polymer chain.

In the first component, the average fluorination ratio of the polysiloxane structure, that is, the ratio of the total number of polysiloxane repeating units comprising fluorine atoms (—O—$SiR^7R^8$—) to the total number of all polysiloxane repeating units (—O—$SiR^5R^6$— repeating unit and —O—$SiR^7R^8$— repeating unit) is, as described above, usually no less than 0.01, preferably no less than 0.05, and more preferably no less than 0.10, and may even be 1, and is, in one embodiment, preferably no more than 0.99, more preferably no more than 0.90, and especially preferably no more than 0.75. The average fluorination ratio of the polysiloxane structure of this lower limit or over makes it possible to improve defoaming performance after shearing. The average fluorination ratio of the polysiloxane structure of this upper limit or below makes it easy to suppress decrease of the lifetime of the defoaming agent induced by precipitation of the defoaming agent.

In the general formulae (7) and (8), the groups same as those described above as $C_{1-18}$ organic groups comprising no fluorine atom in the general formula (1) can be employed as $C_{1-18}$ organic groups comprising no fluorine atom. Preferred embodiments thereof are also the same as those described above.

In the general formulae (7) and (8), the groups same as those described above as organic groups comprising no less than 3 fluorine atoms (fluorinated organic groups) in the general formula (1) can be employed as organic groups comprising no less than 3 fluorine atoms (fluorinated organic groups). Preferred embodiments thereof are also the same as described above.

In the second component, the average functionalization ratio of the hydrocarbyl group $Y^8$, that is, the ratio of the total number of $Y^8$ being a substituted hydrocarbyl group(s) to the total number of $Y^8$ in the second component is, as described above, usually 0 to 0.5, preferably no more than 0.3, more preferably no more than 0.1, and in one embodiment may be 0. When the average functionalization ratio of hydrocarbyl group $Y^8$ is over this upper limit, the lifetime of the defoaming agent tends to decrease because of precipitation of the defoaming agent.

The first component has a weight average molecular weight of preferably 500 to 500,000, more preferably no less than 5000, especially preferably no less than 10,000, and more preferably no more than 250,000, especially preferably no more than 150,000, and most preferably no more than 100,000. The weight average molecular weight of the first component of this lower limit or over makes it possible to further improve defoaming performance. When the weight average molecular weight of the first component is over this upper limit, the lifetime of the defoaming agent tends to decrease because of precipitation of the defoaming agent.

When polymerizing the first component and the second component, the amount of the first component is preferably 0.5 to 80 parts by mass, more preferably no less than 1 parts by mass, further preferably no less than 2 parts by mass, especially preferably no less than 4 parts by mass, and more preferably no more than 75 parts by mass, and especially preferably no more than 70 parts by mass, on the basis of the total amount of the first and second components as 100 parts by mass. The amount of the first component of this lower limit or over makes it possible to further improve defoaming performance. When the amount of the first component is over this upper limit, the lifetime of the defoaming agent tends to decrease because of precipitation of the defoaming agent.

When polymerizing the first component and the second component, the amount of the second component is preferably 20 to 99.5 parts by mass, more preferably no less than 25 parts by mass, especially preferably no less than 30 parts by mass, and more preferably no more than 99 parts by mass, further preferably no more than 98 parts by mass, and especially preferably no more than 96 parts by mass, on the basis of the total amount of the first and second components as 100 parts by mass. The amount of the second component of this lower limit or over makes it easy to suppress decrease of the lifetime of the defoaming agent induced by precipitation of the defoaming agent. The amount of the second component of this upper limit or below makes it easy to further improve defoaming performance.

The weight average molecular weight of the polymer obtained by copolymerization of the first and second components is preferably 10,000 to 1,000,000, more preferably no less than 12,000, further preferably no less than 14,000, especially preferably no less than 15,000, and more preferably no more than 500,000, further preferably no more than 300,000, and especially preferably no more than 200,000. The weight average molecular weight of this lower limit or over makes it easy to improve defoaming performance. The weight average molecular weight of this upper limit or below makes it easy to avoid deterioration of defoaming performance induced by increase of viscosity of the defoaming agent.

In one embodiment, the defoaming agent of the present invention can be obtained by copolymerization of (meth) acrylic acid derivatives. In such an embodiment, $X^1$ to $X^4$ are repeating units obtainable by polymerization of (meth) acryloyl group. In the present description, "(meth)acryl" means acryl and/or methacryl, and "(meth)acryloyl" means acryloyl and/or methacryloyl. The repeating units $X^1$ to $X^4$ obtainable by polymerization of (meth)acryloyl group are represented by the following general formula (16). In such an embodiment, polymerizable functional groups $Q^4$ to $Q^8$ giving the repeating units $X^1$ to $X^4$ are represented by the following general formula (17):

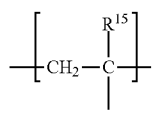

(16)

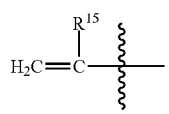

(17)

wherein in the general formulae (16) and (17), $R^{15}$ represents a hydrogen atom or a methyl group; and one remaining valence of the carbon atom bonded to $R^{15}$ is bonded to carbonyl group. A plurality of $R^{15}$ may be all the same, or may be different from each other.

In such an embodiment, the repeating unit represented by the general formula (2) is preferably represented by the following general formula (18). In such an embodiment, the linking group $Z^1$ in the general formula (2) is —CO-$A^1$- group, and one remaining valence of the carbonyl group is bonded to the repeating unit $X^1$:

(18)

wherein in the general formula (18), $R^{15}$ represents a hydrogen atom or a methyl group; $Y^1$ is as described above; $A^1$ is —O— group, —NH— group, or —S— group.

The monomer represented by the general formula (9), which gives the repeating unit represented by the general formula (18), is preferably represented by the following general formula (19). In such an embodiment, the linking group $Z^8$ in the general formula (9) is —CO-$A^1$- group, and one remaining valence of the carbonyl group is bonded to the polymerizable functional group $Q^8$:

(19)

wherein in the general formula (19), $R^{15}$, $A^1$, and $Y^8$ are as described above.

In embodiments such that the polymer is obtained by copolymerization of (meth)acrylic acid derivatives, for example, the groups surrounded by dashed lines in the following general formulae (20) to (22) may be preferably employed as the linking groups $Z^2$ to $Z^7$ in the general formulae (3) to (8). For the sake of clarity of the direction of linking groups, the polymerizable functional group of the general formula (17) and the polysiloxane structure of the general formula (1) are shown together in the following general formulae (20) to (22). Linking groups in the following general formulae (20) to (22) are, though, applicable as any of the linking groups $Z^2$ to $Z^7$ in the general formulae (3) to (8). In the following general formulae (20) to (22), one remaining valence of the carbonyl group of the linking group is bonded to a polymerizable functional group of the general formula (17) ($Q^4$ to $Q^7$), and another remaining valence of the linking group is bonded to a terminal oxygen atom of the polysiloxane structure (the general formula (1)):

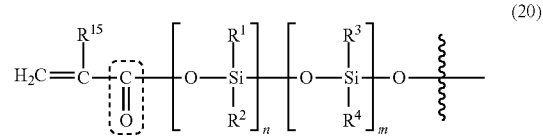

(20)

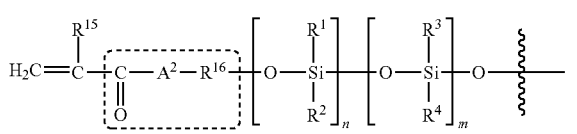

(21)

wherein in the general formula (21), $A^2$ is —O— group, —NH— group, or —S— group; $R^{16}$ is a straight or branched chain alkylene group, a cycloalkylene group, or an arylene group; the carbon number of $R^{16}$ is usually 2 to 30, preferably no less than 3, preferably no more than 24, and more preferably no more than 18.

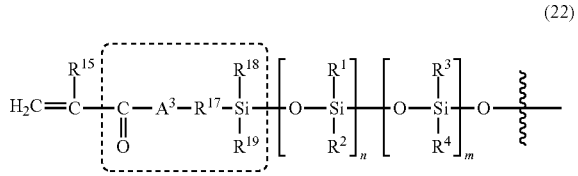

(22)

wherein in the general formula (22), $A^3$ is —O— group, —NH— group, or —S— group; $R^{17}$ is a straight or branched chain alkylene group, a cycloalkylene group, or an arylene group; the carbon number of $R^{17}$ is usually 2 to 30, preferably no less than 3, and preferably no more than 24, and more preferably no more than 18; $R^{18}$ and $R^{19}$ are each independently a $C_{1-18}$ organic group including no fluorine atom.

In the general formula (22), concerning $R^{18}$ and $R^{19}$, the same group as described above concerning $R^1$ and $R^2$ may be employed as "$C_{1-18}$ organic group including no fluorine atom", and preferred embodiments thereof are also the same as described above.

Among the linking groups in the general formulae (20) to (22), linking groups in the general formula (21) or (22) may be more preferably employed and a linking group in the general formula (22) may be especially preferably employed as the linking groups $Z^2$ to $Z^7$ in the general formulae (3) to (8).

(Production)

A way for producing the defoaming agent according to the first aspect of the present invention is not specifically restricted. For example, the defoaming agent may be preferably produced by copolymerizing the above-explained first and second components. For another example, one may first build a main chain skeleton by polymerization reaction, and thereafter introduce the polysiloxane structure via the linking group by reacting the resultant reaction product with a compound having a polysiloxane structure of a desired polymerization degree (the general formula (1)). In the polymerization reaction, known ways such as mass polymerization and solution polymerization can be used without any limitation. Among them, solution polymerization can be preferably employed. Any known polymerization initiator such as an azo initiator and a peroxide initiator may be used as a polymerization initiator without specific limitation. Any known polymerization solvent as follows may be used without specific limitation: aliphatic hydrocarbons (such as hexane, heptane, octane, decane, cyclohexane, and methylcyclohexane), aromatic hydrocarbons (such as benzene, toluene, and xylene), ketones (such as acetone, methyl ethyl ketone, methyl isobutyl ketone, and diisobutyl ketone), esters (such as ethyl acetate, isopropyl acetate, butyl acetate, isobutyl acetate, amyl acetate, isopropyl laurate, isopropyl palmitate, and isopropyl myristate), ethers (such as diethyl ether, diisopropyl ether, tert-butyl methyl ether, dihexyl ether, dimethyl cellosolve, and dioxane), halogenated hydrocarbons (such as tetrachloromethane, chloroform, fluorothene (1,1,1-trifluoroethane), perchloroethylene, ethylene dichloride, dichloromethane, dichloroethane, trichloroethane, tetrachloroethane, chlorobenzene, dichlorobenzene, chrorofluoromethanes (the substitution numbers of chlorine atom(s) and fluorine atom(s) may be any of 1 to 4 respectively, as long as the total number thereof is no more than 4), chlorofluoroethanes (the substitution numbers of chlorine atom(s) and fluorine atom(s) may be any of 1 to 6 respectively, as long as the total number thereof is no more than 6, and the chlorine atom(s) and the fluorine atom(s) may be in any position)), and aliphatic alcohols (such as butanol, 2-ethylhexanol, and lauryl alcohol). Among them, an aliphatic or aromatic hydrocarbon solvent having 6 to 10 carbons, or aliphatic ketone solvents can be especially preferably used, and in one embodiment, methyl isobutyl ketone may be especially preferably used. A polymer having a desired weight average molecular weight can be obtained by adjusting monomer concentration, initiator concentration, reaction temperature, and reaction time in the solvent polymerization.

<2. Defoaming Agent (2)>

The defoaming agent according to the second aspect of the present invention is a defoaming agent obtainable by a process, the process comprising the step of: polymerizing (B) at least one defoaming agent monomer comprising at least one polysiloxane macromonomer selected from the compounds represented by the following general formula (10) or (11) (hereinafter may be referred to as "defoaming agent monomer (B)", or simply "component (B)") in (A) a polymerization solvent (hereinafter may be simply referred to as "component (A)") under coexistence of (C) a polymer soluble in the polymerization solvent (hereinafter may be referred to as "coexisting polymer (C)", or simply "component (C)"):

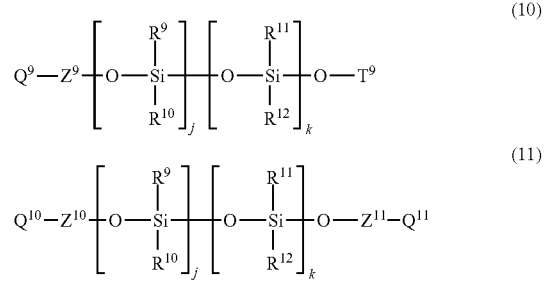

wherein in the general formulae (10) and (11), polysiloxane repeating units may be in any order;

each of $R^9$ and $R^{10}$ is independently a $C_{1-18}$ organic group comprising no fluorine atom;

each of $R^{11}$ and $R^{12}$ is independently an organic group comprising no less than 3 fluorine atoms or a $C_{1-18}$ organic group comprising no fluorine atom, wherein at least one of $R^{11}$ and $R^{12}$ is the organic group comprising no less than 3 fluorine atoms:

each of $Q^9$, $Q^{10}$, and $Q^{11}$ is independently a polymerizable functional group comprising an ethylenic unsaturated group;

$Z^9$ is a linking group linking the polymerizable functional group $Q^9$ and a polysiloxane moiety;

$Z^{10}$ is a linking group linking the polymerizable functional group $Q^{10}$ and a polysiloxane moiety;

$Z^{11}$ is a linking group linking the polymerizable functional group $Q^{11}$ and a polysiloxane moiety;

$T^9$ is a non-polymerizable organic group;
j is an integer of no less than 0;
k is an integer of no less than 1; and
j+k is 5 to 2000.

(Polymerization system)

Any known polymerization system in which polymerization is conducted in a solvent can be employed, and radical polymerization can be preferably employed as a polymerization system. Examples of polymerization systems that can be employed include: dispersion polymerization, suspension polymerization, miniemulsion polymerization, microemulsion polymerization, emulsion polymerization, and solution polymerization. Among them, dispersion polymerization and solution polymerization can be especially preferably employed. Examples of radical polymerization include conventional radical polymerization, and living radical polymerization. Conventional radical polymerization can be preferably employed.

((A) Polymerization Solvent)

A solvent suitable for the employed polymerization system can be suitably selected as the polymerization solvent from solvents which can dissolve the coexisting polymer (C) (described later), and preferably solvents which can dissolve the defoaming agent monomer (B) and the coexisting polymer (C).

((B) Defoaming Agent Monomer)

A radical polymerizable defoaming agent monomer can be preferably used, and a radical polymerizable monomer having at least one radical polymerizable ethylenic unsaturated group can be especially preferably used as the defoaming agent monomer. The defoaming agent monomer (B) comprises at least one polysiloxane macromonomer selected from the compounds represented by the general formula (10) or (11). Using such a radical polymerizable macromonomer gives the obtained defoaming agent polymer good defoaming performance. As regards the compound represented by the general formula (10), one may be used alone, or two or more may be used in combination. As regards the compound represented by the general formula (11), one may be used alone, or two or more may be used in combination. As a polysiloxane macromonomer, the compound represented by the general formula (10) may be used alone, or the compound represented by the general formula (11) may be used alone, or the compounds represented by the general formulae (10) and (11) may be used in combination.

In the general formulae (10) and (11), $Q^9$ to $Q^{11}$ may be each independently a combination of at least two polymerizable functional groups; $Z^9$ to $Z^{11}$ may be each independently a combination of at least two linking groups; and $T^9$ may be a combination of at least two organic groups.

In the general formulae (10) and (11), the same group as described above concerning $Q^5$ to $Q^7$ in the general formulae (7) and (8) may be employed as $Q^9$ to $Q^{11}$, and preferred embodiments thereof are also the same as described above.

In the general formulae (10) and (11), the same group as described above concerning $Z^5$ to $Z^7$ in the general formulae (7) and (8) may be employed as $Z^9$ to $Z^{11}$, and preferred embodiments thereof are also the same as described above.

In the general formula (10), the same group as described above concerning $T^5$ in the general formulae (7), that is, the same group as described above concerning $T^2$ in the general formula (3) may be employed as $T^9$, and preferred embodiments thereof are also the same as described above.

In the general formulae (10) and (11), polysiloxane repeating units may be arranged in any order. In the general formulae (10) and (11), when both j and k are no less than 1, the polysiloxane structure may be a random copolymer, or may be an alternating copolymer, or may be a block copolymer.

In the general formulae (10) and (11), preferred embodiments of the polymerization degree of the polysiloxane structure (j±k) are the same as the polymerization degree of the polysiloxane structure (n+m: see the general formula (1)) described above concerning the first polymer chain in the defoaming agent according to the first aspect of the present invention.

In the component (B), the average fluorination ratio of the polysiloxane structure, that is, the ratio of the total number of polysiloxane repeating units comprising fluorine atoms ($-O-SiR^{11}R^{12}-$) to the total number of all polysiloxane repeating units ($-O-SiR^9R^{10}-$ repeating unit and $-O-SiR^{11}R^{12}-$ repeating unit) is usually no less than 0.01, preferably no less than 0.05, more preferably no less than 0.10, and may even be 1, and is, in one embodiment, preferably no more than 0.99, more preferably no more than 0.90, and especially preferably no more than 0.75. The average fluorination ratio of the polysiloxane structure of this lower limit or over makes it possible to improve defoaming performance after shearing. The average fluorination ratio of the polysiloxane structure of this upper limit or below makes it easy to suppress decrease of the lifetime of the defoaming agent induced by precipitation of the defoaming agent.

In the general formulae (10) and (11), the groups same as those described above as $C_{1-18}$ organic groups comprising no fluorine atom in the general formula (1) can be employed as $C_{1-18}$ organic groups comprising no fluorine atom. Preferred embodiments thereof are also the same as described above.

In the general formulae (10) and (11), the groups same as those described above as organic groups comprising no less than 3 fluorine atoms (fluorinated organic groups) in the general formula (1) can be employed as organic groups comprising no less than 3 fluorine atoms (fluorinated organic groups). Preferred embodiments thereof are also the same as described above.

The polysiloxane macromonomer has a weight average molecular weight of preferably 500 to 500,000, more preferably no less than 5000, especially preferably no less than 10,000, and more preferably no more than 250,000, especially preferably no more than 150,000, and most preferably no more than 100,000. The weight average molecular weight of the polysiloxane macromonomer of this lower limit or over makes it possible to further improve defoaming performance. When the weight average molecular weight of the polysiloxane macromonomer is over this upper limit, the lifetime of the defoaming agent tends to decrease because of precipitation of the defoaming agent.

As the defoaming agent monomer, the polysiloxane macromonomer may be used alone, or may be used in combination with other radical polymerizable monomer(s) as long as defoaming performance is not impaired. One example of the other radical polymerizable monomers to be copolymerized with the polysiloxane macromonomer is the monomer represented by the following general formula (23) (hereinafter may be simply referred to as "fluorinated monomer"):

$$Q^{12}\text{-}Z^{12}\text{—}Y^{12} \qquad (23)$$

wherein in the general formula (23), $Q^{12}$ is a polymerizable functional group comprising an ethylenic unsaturated group; $Y^{12}$ is an organic group comprising no less than 3 fluorine atoms; and $Z^{12}$ is a linking group linking $Q^{12}$ and $Y^{12}$.

In the general formula (23), $Q^{12}$ may be a combination of at least two polymerizable functional groups; $Z^{12}$ may be a combination of at least two linking groups; $Y^{12}$ may be a combination of at least two organic groups.

In the general formula (23), the same group as described above concerning $Q^8$ in the general formula (9) may be employed as $Q^{12}$, and preferred embodiments thereof are also the same as described above.

In the general formula (23), the same group as described above concerning $Z^8$ in the general formula (9) may be employed as $Z^{12}$, and preferred embodiments thereof are also the same as described above.

Concerning $Y^{12}$ in the general formula (23), the same group as described above as the organic groups comprising no less than 3 fluorine atoms in the general formula (1) may be employed as the organic group comprising no less than 3 fluorine atoms, and preferred embodiments thereof are also the same as described above.

Another example of the other radical polymerizable monomers to be copolymerized with the polysiloxane macromonomer is a monomer represented by the following general formula (24):

$$Q^{13}\text{-}Z^{13}\text{—}Y^{13} \qquad (24)$$

wherein in the general formula (24), $Q^{13}$ is a polymerizable functional group comprising an ethylenic unsaturated group; $Y^{13}$ is a substituted or unsubstituted $C_{1\text{-}40}$ hydrocarbyl group; and $Z^{13}$ is a linking group linking $Q^{13}$ and $Y^{13}$.

In the general formula (24), $Q^{13}$ may be a combination of at least two polymerizable functional groups; $Z^{13}$ may be a combination of at least two linking group; $Y^{13}$ may be a combination of at least two hydrocarbyl groups.

In the general formula (24), the same group as described above concerning $Q^8$ in the general formula (9) may be employed as $Q^{13}$, and preferred embodiments thereof are also the same as described above.

In the general formula (24), the same group as described above concerning $Z^8$ in the general formula (9) may be employed as $Z^{13}$, and preferred embodiments thereof are also the same as described above.

Concerning $Y^{13}$ in the general formula (24), the same group as described above concerning $Y^8$ in the general formula (9) may be employed as the substituted or unsubstituted $C_{1\text{-}40}$ hydrocarbyl group, and preferred embodiments thereof are also the same as described above.

Other examples of the other radical polymerizable monomers to be copolymerized with the polysiloxane macromonomer include: styrene, (meth)acrylonitrile, vinylpyridine, vinyl acetate, and vinyl halides.

A multifunctional monomer having two or more radical polymerizable functional groups in one molecule may be used as another radical polymerizable monomer to be copolymerized with the polysiloxane macromonomer. Such a multifunctional monomer may be used together with the above described monofunctional radical polymerizable monomer. Addition of a multifunctional monomer to the polymerization system makes it possible to control the particle size of the obtained defoaming agent polymer. Multifunctional monomers that can be used in the present invention are not restricted as long as being soluble in the polymerization solvent, and examples thereof include: esters of (meth)acrylic acid and $C_{2\text{-}12}$ alkyl alcohols, $C_{2\text{-}12}$ alicyclic alkyl alcohols, or $C_{2\text{-}12}$ aromatic multifunctional alcohols, such as ethylene glycol di(meth)acrylate, trimethylolpropane tri(meth)acrylate, and pentaerythritol tetra(meth)acrylate; di(meth)acrylates of poly (or oligo) alkylene glycols; and divinyl benzene.

The proportion of the polysiloxane macromonomer (the general formula (10) and/or (11)) in the defoaming agent monomer is preferably no less than 10 mass %, more preferably no less than 50 mass %, further preferably no less than 65 mass %, and especially preferably no less than 70 mass %, and may even be 100 mass %, on the basis of the total mass of the defoaming agent monomer (100 mass %).

In view of improving defoaming performance, the proportion of the fluorinated monomer to the defoaming agent monomer is preferably no more than 50 mass %, more preferably no more than 35 mass %, and further preferably no more than 30 mass %, on the basis of the total mass of the defoaming agent monomer (100 mass %). The lower limit thereof is not restricted, and may even be 0 mass % in one embodiment, or may be no less than 2 mass % in another embodiment, or may be no less than 5 mass % in another embodiment.

((C) Coexisting Polymer)

Examples of the coexisting polymer include: non-dispersant polyalkyl (meth)acrylate; dispersant polyalkyl (meth)acrylate having a polar group such as hydroxy group, amino group, or amide group in its side chain (the polar group may be introduced by random copolymerization or block copolymerization); comb-shaped polyalkyl (meth)acrylate having polyisobutylene in its side chain, or having a hydrogenated product of polybutadiene or polyisoprene in its side chain; star-shaped polyalkyl (meth)acrylate having a core moiety, and three or more arm moieties (branch moieties) bonded to the core moiety; olefin copolymer; hydrogenated product of styrene-diene copolymer; hydrogenated product of polyisoprene; polyisobutylene; maleated polyisobutylene; imidated product of maleated polyisobutylene; hydrogenated polybutadiene; oil-soluble polyester; long-chain alkyl modified silicone; and EPDM (ethylene-propylene-diene rubber). The coexisting polymer can be suitably selected by the skilled person according to a specific polymerization solvent and polymerization system.

(Polymerization Conditions)

Reaction conditions of polymerization reaction can be suitably determined by the skilled person according to the employed polymerization system, polymerization solvent, defoaming agent monomer, and coexisting monomer.

Upon polymerization, the amount of the polysiloxane macromonomer is preferably 0.5 to 80 parts by mass, more preferably no less than 1 parts by mass, further preferably no less than 2 parts by mass, especially preferably no less than 4 parts by mass, and more preferably no more than 50 parts by mass, further Preferably no more than 30 parts by mass, and especially preferably no more than 20 parts by mass, on the basis of the total amount of the components (B) and (C) as 100 parts by mass. The amount of the polysiloxane macromonomer of this lower limit or over makes it possible to further improve defoaming performance. The amount of the polysiloxane macromonomer more than this upper limit tends to lead to deteriorated lifetime of the defoaming agent because of precipitation of the defoaming agent.

(Defoaming Agent Particles)

A dispersion of defoaming agent particles can be obtained when polymerization reaction is completed in the above described various polymerization systems where polymerization is conducted in a solvent, except in solution polymerization. The average particle size of the defoaming agent particles after polymerization (average particle size obtained by dynamic light scattering and cumulant analysis) is preferably no more than 10 μm, more preferably no more than 5 μm, and especially preferably no more than 2 μm. The lower limit thereof is not restricted, but for example, may be no less than 0.05 µm. When the average particle size of the defoaming agent particles is over 10 µm, segregation and precipitation of the defoaming agent tend to be significant, and thus defoaming performance tends to deteriorate.

<2.1 Defoaming Agent Obtained by Dispersion Polymerization>

In one preferred embodiment, the defoaming agent according to the second aspect of the present invention is obtained by dispersion polymerization. In dispersion polymerization, the (C) polymer soluble in the polymerization solvent (coexisting polymer) works as a polymer dispersant (C1).

In dispersion polymerization, which is one embodiment of radical polymerization, polymerization of monomer is conducted under the presence of a polymer (polymer dispersant) dissolved in a solvent (polymerization solvent), such that on one hand, the monomer itself is soluble in the solvent, and on the other hand, a polymer formed by polymerization of the monomer is insoluble in the solvent. In dispersion polymerization, polymerization initiates in a uniform solution, and thereafter the system gradually becomes a suspension because of formation of nuclei of particles by the polymer segregated accompanying the progress of the polymerization reaction. At this time, the polymer which is segregated accompanying the progress of the polymerization reaction is dispersed and stabilized as fine particles by the polymer (polymer dispersants) which is soluble in the solvent and exists in the system from the beginning. The polymer finally obtained is in the form of fine particles stably dispersed in the solvent.

((A) Polymerization Solvent)

The polymerization solvent used in dispersion polymerization is such a solvent that on one hand, the defoaming agent monomer (B) itself (in the form of monomer) is soluble in the solvent, and on the other hand, the polymer formed by polymerization of the defoaming agent monomer (B) is insoluble in the solvent.

The polymerization solvent in dispersion polymerization is preferably a solvent comprising at least one selected from hydrocarbon solvents having no less than 6 carbons, mineral oils, synthetic oils, and ester oils. Specifically, when the defoaming agent of the present invention is added to lubricating oil, a lubricant base oil such as a mineral oil and a synthetic oil is preferably used as the dispersion polymerization solvent.

((C1) Polymer Dispersant)

The polymer dispersant used in dispersion polymerization is not restricted as long as it is soluble in the polymerization solvent, and is able to finely disperse the defoaming agent polymer after polymerization in the polymerization solvent. Examples of polymers that can be used as the polymer dispersant (C1) in dispersion polymerization include: non-dispersant polyalkyl (meth)acrylate; dispersant polyalkyl (meth)acrylate having a polar group such as hydroxy group, amino group, or amide group in its side chain (the polar group may be introduced by random copolymerization or block copolymerization); comb-shaped polyalkyl (meth)acrylate having polyisobutylene in its side chain, or having a hydrogenated product of polybutadiene or polyisoprene in its side chain; star-shaped polyalkyl (meth)acrylate having a core moiety, and three or more arm moieties (branch moieties) bonded to the core moiety; olefin copolymer; hydrogenated product of styrene-diene copolymer; hydrogenated product of polyisoprene; polyisobutylene; maleated polyisobutylene; imidated product of maleated polyisobutylene; hydrogenated polybutadiene; oil-soluble polyester; long-chain alkyl modified silicone; and EPDM (ethylene-propylene-diene rubber). In the present description, "dispersant" polyalkyl (meth)acrylate means polyalkyl (meth)acrylate having a polar group such as hydroxy group, amino group, or amide group in its side chain, and "non-dispersant" polyalkyl (meth)acrylate means polyalkyl (meth)acrylate not having such a polar group in its side chain. While incorporation of the former polyalkyl (meth)acrylate in lubricating oil gives detergent dispersant effect, detergent dispersant effect is not expected when the latter polyalkyl (meth)acrylate is incorporated in lubricating oil. Thus, in the technical field of lubricating oil, the former polyalkyl (meth) acrylate is referred to as "dispersant" polyalkyl (meth) acrylate, and the latter polyalkyl (meth)acrylate is referred to as "non-dispersant" polyalkyl (meth)acrylate. The present description also follows this terminology in the technical field of lubricating oil concerning polyalkyl (meth)acrylate. It is, though, noted that in the present description, even "non-dispersant" polyalkyl (meth)acrylate can work as the polymer dispersant in dispersion polymerization.

Among them, polyalkyl (meth)acrylate having a weight average molecular weight of 10,000 to 1,000,000 can be preferably used as the polymer dispersant (C1) in dispersion polymerization. Specifically preferred examples of such polyalkyl (meth)acrylate include polyalkyl (meth)acrylate having $C_{1-30}$ straight or branched chain alkyl groups. The polyalkyl (meth)acrylate may be of dispersant type, or may be of non-dispersant type. This polyalkyl (meth)acrylate may be a linear polymer, or may be a comb-shaped polymer, or may be a star-shaped polymer. When the weight average molecular weight of polyalkyl (meth)acrylate used as the polymer dispersant is under 10,000, the polymer dispersant is short in dispersing performance, which makes it difficult to form the obtained defoaming agent into fine particles. When the weight average molecular weight of polyalkyl (meth)acrylate is over 1,000,000, viscosity of the system during dispersion polymerization is too high, which makes it difficult to stir the reaction mixture. The weight average molecular weight of polyalkyl (meth)acrylate as the polymer dispersant in dispersion polymerization is more preferably no less than 30,000.

(Polymerization Conditions)

The concentration of the defoaming agent monomer (B) (concentration of all the monomers in total when at least two monomers are used) in the reaction mixture when dispersion polymerization initiates is preferably no less than 5 mass %, more preferably no less than 7 mass %, and preferably no more than 50 mass %, more preferably no more than 30 mass %, and further preferably no more than 20 mass %, on the basis of the total mass of the reaction mixture (100 mass %). When the monomer concentration is under 5 mass %, the polymerization rate significantly decreases, and thus the conversion ratio of monomer to polymer decreases. When the monomer concentration is over 50 mass %, the average particle size of the obtained defoaming agent fine particles increases.

The concentration of the polymer dispersant (C1) in dispersion polymerization is preferably no less than 0.1 mass %, more preferably no less than 0.15 mass %, and preferably no more than 20 mass %, on the basis of the total mass of the reaction mixture (100 mass %). When the concentration of the polymer dispersant is under 0.1 mass %, the average particle size of the defoaming agent fine particles increases. When the concentration of the polymer dispersant is over 20 mass %, solubility of the monomer decreases, or viscosity of the reaction mixture significantly increases, which makes it difficult to stir the reaction mixture.

Reaction temperature in dispersion polymerization can be suitably selected by the skilled person according to the used combination of the polymerization solvent, the defoaming agent monomer, the radical initiator, and the polymer dispersant, and the concentrations of the defoaming agent monomer and the polymer dispersant.

Any radical polymerization initiator soluble in the dispersion polymerization system at the polymerization temperature can be used without any limitation as a radical polymerization initiator for dispersion polymerization. Examples thereof include initiators such as organic peroxide initiators and azo compounds. The amount of the radical initiator is preferably no less than 0.1 parts by mass, more preferably no less than 1 parts by mass, and preferably no more than 10 parts by mass, on the basis of 100 parts by mass of the used monomer. When the amount of the radical initiator is under 0.1 parts by mass on the basis of 100 parts by mass of the defoaming agent monomer, the conversion ratio of monomer to polymer decreases, which is thus unfavorable. When the amount of the radical initiator is over 10 parts by mass on the basis of 100 parts by mass of the defoaming agent monomer, defoaming performance deteriorates due to residue of the radical initiator, which is thus unfavorable.

(Defoaming Agent Particles)

In the defoaming agent obtained by dispersion polymerization, the defoaming agent polymer is in the form of fine particles as a result of dispersion polymerization, which makes it possible to suppress deterioration of defoaming performance induced by segregation and precipitation of the defoaming agent particles. The average particle size of the defoaming agent particles obtained by dispersion polymerization (average particle size obtained by dynamic light scattering and cumulant analysis) is preferably no more than 10 µm, more preferably no more than 5 µm, especially preferably no more than 2 µm, and preferably no less than 0.05 µm, more preferably no less than 0.1 µm, and especially preferably no less than 0.3 µm. When the average particle size of the defoaming agent particles is over 10 µm, segregation and precipitation of the defoaming agent are significant, and thus defoaming performance deteriorates. Dispersion polymerization makes it easy to have the average particle size of the defoaming agent particles of no more than 10 µm.

<2.2 Defoaming Agent Obtained by Solution Polymerization>

In another embodiment, the defoaming agent according to the second aspect of the present invention is obtained by solution polymerization. In solution polymerization, a polymer after completion of polymerization reaction remains dissolved in the solvent. Solution radical polymerization is preferable as solution polymerization.

((A) Polymerization Solvent)

As the polymerization solvent in solution polymerization, any solvent which can dissolve the defoaming agent monomer (B) and the polymer formed by polymerization of the defoaming agent monomer may be used without particular limitation.

Preferred examples of the polymerization solvent in solution polymerization include: aliphatic hydrocarbons (such as hexane, heptane, octane, decane, cyclohexane, and methylcyclohexane), aromatic hydrocarbons (such as benzene, toluene, and xylene), ketones (such as acetone, methyl ethyl ketone, and methyl isobutyl ketone), esters (such as ethyl acetate, isopropyl acetate, butyl acetate, isobutyl acetate, amyl acetate, isopropyl laurate, isopropyl palmitate, and isopropyl myristate), ethers (such as diethyl ether, diisopropyl ether, tert-butyl methyl ether, dihexyl ether, dimethyl cellosolve, and dioxane), halogenated hydrocarbons (such as tetrachloromethane, chloroform, fluorothene (1,1,1-trifluoroethane), perchloroethylene, ethylene dichloride, dichloromethane, dichloroethane, trichloroethane, tetrachloroethane, chlorobenzene, dichlorobenzene, chrorofluoromethanes (the substitution numbers of chlorine atom(s) and fluorine atom(s) may be any of 1 to 4 respectively, as long as the total number thereof is no more than 4), chlorofluoroethanes (the substitution numbers of chlorine atom(s) and fluorine atom (s) may be any of 1 to 6 respectively, as long as the total number thereof is no more than 6, and the chlorine atom(s) and the fluorine atom(s) may be in any position)), aliphatic alcohols (such as butanol, 2-ethylhexanol, and lauryl alcohol), and mineral oils. Among them, an aliphatic or aromatic hydrocarbon solvent having 6 to 10 carbons, or aliphatic ketone solvents can be especially preferably used. One polymerization solvent may be used alone, or two or more polymerization solvents may be used in combination.

((C) Coexisting Polymer)

Examples of polymers that can be used as the coexisting polymer in solution polymerization include: non-dispersant polyalkyl (meth)acrylate; dispersant polyalkyl (meth)acrylate having a polar group such as hydroxy group, amino group, or amide group in its side chain (the polar group may be introduced by random copolymerization or block copolymerization); comb-shaped polyalkyl (meth)acrylate having polyisobutylene in its side chain, or having a hydrogenated product of polybutadiene or polyisoprene in its side chain; star-shaped polyalkyl (meth)acrylate having a core moiety, and three or more arm moieties (branch moieties) bonded to the core moiety; olefin copolymer; hydrogenated product of styrene-diene copolymer; hydrogenated product of polyisoprene; polyisobutylene; maleated polyisobutylene; imidated product of maleated polyisobutylene; hydrogenated polybutadiene; oil-soluble polyester; long-chain alkyl modified silicone; and EPDM (ethylene-diene-propylene rubber).

Among them, polyalkyl (meth)acrylate may be preferably used as the component (C) in solution polymerization. Specifically preferred examples of polyalkyl (meth)acrylate include polyalkyl (meth)acrylate having $C_{1-30}$ straight or branched chain alkyl groups. Polyalkyl (meth)acrylate may be of dispersant type, or may be of non-dispersant type. Polyalkyl (meth)acrylate may be a linear polymer, a comb-shaped polymer, or a star-shaped polymer.

The weight average molecular weight of the component (C) in solution polymerization is preferably 10,000 to 1,000,000, and more preferably no less than 30,000. When the weight average molecular weight of the component (C) is under 10,000, it is difficult to improve durability of the obtained defoaming agent polymer against centrifugal effect. When the weight average molecular weight of the component (C) is over 1,000,000, viscosity of the reaction mixture is too high, which makes it difficult to stir the reaction mixture.

(Polymerization Conditions)

The concentration of the component (B) (concentration of all the monomers in total when at least two monomers are used) in the reaction mixture when solution polymerization initiates is preferably no less than 5 mass %, more preferably no less than 7 mass %, and preferably no more than 50 mass %, more preferably no more than 30 mass %, and further preferably no more than 20 mass %, on the basis of the total mass of the reaction mixture (100 mass %). When the monomer concentration is under 5 mass %, the polymerization rate significantly decreases, and thus the conversion ratio of monomer to polymer decreases. When the monomer concentration is over 50 mass %, the obtained defoaming agent polymer is less easy to be finely dispersed.

The concentration of the component (C) in solution polymerization is preferably no less than 0.1 mass %, more preferably no less than 0.15 mass %, and preferably no more than 20 mass %, on the basis of the total mass of the reaction mixture (100 mass %). When the concentration of the component (C) is under 0.1 mass %, the obtained defoaming agent polymer is less easy to be finely dispersed. When the concentration of the component (C) is over 20 mass %, solubility of the monomer decreases, or viscosity of the polymerization solution significantly increases, which makes it difficult to stir the polymerization solution.

Reaction temperature in solution polymerization can be suitably selected by the skilled person according to the used combination of the polymerization solvent, the component (B), the component (C), and the radical initiator, and the concentrations of the component (B) and the component (C).

Any radical polymerization initiator soluble in the reaction solution at the polymerization temperature can be used without any limitation as a radical polymerization initiator for solution polymerization. Examples thereof include initiators such as organic peroxide initiators and azo compounds. The amount of the radical initiator is preferably no less than 0.1 parts by mass, more preferably no less than 1 parts by mass, and preferably no more than 10 parts by mass, on the basis of 100 parts by mass of the used monomer. When the amount of the radical initiator is under 0.1 parts by mass on the basis of 100 parts by mass of the defoaming agent monomer, the conversion ratio of monomer to polymer decreases, which is thus unfavorable. When the amount of the radical initiator is over 10 parts by mass on the basis of 100 parts by mass of the defoaming agent monomer, defoaming performance deteriorates due to residue of the radical initiator, which is thus unfavorable.

In the defoaming agent obtained by solution polymerization, the defoaming agent polymer has improved fine dispersibility as a result of solution polymerization under coexistence of the component (C). Thus, the defoaming agent polymer can be easily finely dispersed in a lubricating oil composition even by incorporating the defoaming agent into the lubricating oil composition in the same manner as that for conventional defoaming agents. Further, the defoaming agent polymer remains finely dispersed in a lubricating oil composition even after a long term has passed, or after strong centrifugal effect is applied. Therefore, incorporation of the defoaming agent into a lubricating oil composition makes it possible to suppress deterioration of defoaming performance induced by segregation and precipitation of the defoaming agent.

Fine dispersibility of the defoaming agent obtained by solution polymerization can be evaluated by the average particle size of the defoaming agent particles in a dispersion comprising the defoaming agent. The average particle size (average particle size obtained by dynamic light scattering and cumulant analysis) of the defoaming agent particles in a dispersion (at 25° C.) obtained by adding 1 mL of the solution after solution polymerization, which comprises the defoaming agent, to 10 mL of a mineral oil, followed by sufficient stirring, to make the defoaming agent finely dispersed, is preferably no more than 10 μm, more preferably no more than 5 μm, especially preferably no more than 2 μm, and preferably no less than 0.05 μm, more preferably no less than 0.1 μm, and especially preferably no less than 0.3 μm. For example, YUBASE™ 4 manufactured by SK Lubricants Co., Ltd. (kinematic viscosity (100° C.): 4.2 mm$^2$/s, kinematic viscosity (40° C.): 19.4 mm$^2$/s, viscosity index: 125) is preferably used as the mineral oil for measurement of the average particle size. Preferably, the above described stirring can be carried out in a 100 mL beaker using a columnar magnetic stir bar made from PTFE of 8 mm in diameter and 30 mm in length at ambient temperature at 200 rpm for 30 minutes. For example, a dynamic light scattering measurement device, Photal ELSZ-2000S (manufactured by Otsuka Electronics Co., Ltd.) can be preferably used for measurement of the average particle size by dynamic light scattering. A defoaming agent such that the average particle size of defoaming agent particles in the dispersion cannot be made no more than 10 μm even after sufficient stirring, causes significant segregation and precipitation of the defoaming agent, and shows deteriorated defoaming performance. The defoaming agent obtained by solution polymerization makes it easy to obtain a dispersion in which the average particle size of the defoaming agent particles is no more than 10 μm, and no special operation other than stirring is necessary for obtaining such a dispersion.

<3. Lubricating Oil Composition>

The lubricating oil composition according to the third aspect of the present invention comprises: a lubricating base oil; and the defoaming agent according to the first or second aspect, in an amount of 1 to 500 mass ppm in terms of silicon on the basis of the total mass of the composition. One defoaming agent may be used alone, or two or more defoaming agents may be used in combination.

(Lubricant Base Oil)

A lubricant base oil in the lubricating oil composition of the present invention is not specifically restricted, but a mineral base oil or a synthetic base oil used for conventional lubricating oil can be used.

Specific examples of mineral base oils include: oils obtained by refining lubricant oil fractions that are obtained by vacuum distillation of atmospheric residue obtained by atmospheric distillation of crude oil, through at least one of processes such as solvent deasphalting, solvent extraction, hydrocracking, solvent dewaxing, and hydrorefining; wax isomerized mineral oils; and lubricant base oils produced by a process of isomerizing GTL WAX (gas to liquid wax) that is produced by a Fischer-Tropsch process, and the like.

Examples of synthetic base oils include: poly-α-olefins such as 1-octene oligomer and 1-decene oligomer, or hydrogenated products thereof; isobutene oligomer or hydrogenated product thereof; paraffin; diesters (such as ditridecyl glutarate, bis(2-ethylhexyl) adipate, diisodecyl adipate, ditridecyl adipate, and bis(2-ethylhexyl) sebacate); polyol esters (such as trimethylolpropane caprilate, trimethylolpropane pelargonate, pentaerythritol 2-ethylhexanoate, and pentaerythritol pelargonate); polyoxyalkylene glycol; dialkyl diphenyl ether; and polyphenyl ether. Examples other than them include: aromatic synthetic oils such as alkylnaphthalene, alkylbenzene, and aromatic esters, or mixtures thereof.

In the lubricating oil composition of the present invention, mineral base oils, synthetic base oils, any mixture of two or more lubricating oils selected therefrom, or the like can be used as the lubricant base oil. Examples thereof include at least one mineral base oil, at least one synthetic base oil, and a mixed oil of at least one mineral base oil and at least one synthetic base oil.

The kinematic viscosity of the base oil at 100° C. is preferably 1.0 to 50 mm$^2$/s. Too high kinematic viscosity of the base oil tends to lead to deteriorated low-temperature viscosity. In contrast, too low kinematic viscosity of the base oil leads to deteriorated anti-wear performance on sliding parts of various kinds of machinery. In view of preventing viscosity decrease of the obtained lubricating oil composition, the kinematic viscosity of the base oil at 100° C. is more preferably 2.0 to 15 mm²/s, and especially preferably 2 to 10 mm²/s.

The pour point of the base oil is not specifically restricted, but preferably is no more than −10° C., and especially preferably no more than −15° C.

The viscosity index of the base oil is preferably no less than 90 in view of preventing viscosity decrease at high temperature.

(Defoaming Agent)

The defoaming agent according to the first and second aspects of the present invention has already been described. The content of the defoaming agent in the lubricating oil composition of the present invention (the total content in the case of the combination of two or more defoaming agents) is 1 to 500 mass ppm, and preferably no less than 5 mass ppm, and, in one embodiment, preferably no more than 250 mass ppm, more preferably no more than 100 mass ppm, and further preferably no more than 50 mass ppm, in terms of silicon on the basis of the total mass of the composition. No effect is expectable as the defoaming agent if the content of the defoaming agent is less than 1 mass ppm in terms of Si. When the content of the defoaming agent is over 500 mass ppm in terms of Si, precipitation of the defoaming agent etc. occur, and thus the lifetime of the defoaming agent decreases, which is thus unfavorable:

(Other Additives)

The lubricating oil composition of the present invention may further contain at least one additive selected from an ashless dispersant, an antioxidant, a friction modifier, an anti-wear agent or extreme-pressure agent, a metallic detergent, a viscosity index improver or pour point depressant, a corrosion inhibitor, an anti-rust agent, a metal deactivator, a demulsifier, a defoaming agent other than the defoaming agent according to the first or second aspect of the present invention, and a coloring agent, in addition to the above described lubricant base oil and defoaming agent according to the first or second aspect of the present invention. One may have an additive package by adding one or more additives selected from them to the defoaming agent of the present invention.

Any known ashless dispersant such as succinimide ashless dispersants can be used as an ashless dispersant. Examples thereof include: polybutenylsuccinimides having a polybutenyl group, the polybutenyl group having a number average molecular weight of 900 to 3500; polybutenylbenzylamines; polybutenylamines; and derivatives thereof (such as boric acid-modified products).

When the lubricating oil composition of the present invention contains an ashless dispersant, the content thereof is normally no less than 0.01 mass %, preferably no less than 0.1 mass %, normally no more than 20 mass %, and preferably no more than 10 mass %, on the basis of the total mass of the lubricating oil composition, that is, to the total mass of the lubricating oil composition as 100 mass %.

Any known antioxidant such as phenol antioxidants and amine antioxidants can be used as an antioxidant. Examples thereof include amine antioxidants such as alkylated diphenylamines, phenyl-α-naphthylamine, and alkylated α-naphthylamines; and phenol antioxidants such as 2,6-di-tert-butyl-4-methylphenol, 4,4'-methlenebis(2,6-di-tert-butylphenol).

When the lubricating oil composition of the present invention contains an antioxidant, the content thereof is normally no more than 5.0 mass %, preferably no more than 3.0 mass %, preferably no less than 0.1 mass %, and more preferably no less than 0.5 mass %, on the basis of the total mass of the lubricating oil composition.

Any known friction modifier can be used as a friction modifier. Examples thereof include: aliphatic acid esters; aliphatic acid amides; phosphorus compounds such as phosphate esters, phosphite esters, and thiophosphate esters; organic molybdenum compounds such as MoDTP and MoDTC; organic zinc compounds such as ZnDTP; organic boron compounds such as alkylmercaptyl borates; graphite; molybdenum disulfide; antimony sulfide; boron compounds; and polytetrafluoroethylene.

When the lubricating oil composition of the present invention contains a friction modifier, the content thereof is normally 0.05 to 5 mass % on the basis of the total mass of the lubricating oil composition.

Any known anti-wear agent or extreme-pressure agent can be used as an anti-wear agent or extreme-pressure agent. Examples thereof include: metal dithiophosphates (such as Zn salt, Pb salt, Sb salt, and Mo salt), metal dithiocarbamates (such as Zn salt, Pb salt, Sb salt, and Mo salt), naphthenic acid metal salts (such as Pb salt), fatty acid metal salts (such as Pb salt), boron compounds, phosphate esters, phosphite esters, alkyl hydrogenphosphites, phosphate ester amine salts, phosphate ester metal salts (such as Zn salt), disulfides, sulfurized fat, sulfurized olefins, dialkyl polysulfides, diarylalkyl polysulfides, and diaryl polysulfides.

When the lubricating oil composition of the present invention contains an anti-wear agent or extreme-pressure agent, the content thereof is normally 0.05 to 5 mass % on the basis of the total mass of the lubricating oil composition.

Any known metallic detergent can be used as a metallic detergent. Examples thereof include alkali metal and alkaline earth metal sulfonates, alkali metal and alkaline earth metal phenates, alkali metal and alkaline earth metal salicylates, and combinations thereof. These metallic detergents may be overbased. In the present description, "alkaline earth metal" shall encompass Mg.

When the lubricating oil composition of the present invention contains a metallic detergent, the content thereof is not specifically restricted. When the composition is for automobile transmissions, the content thereof is normally 0.005 to 1.0 mass % in terms of metal elements on the basis of the total mass of the lubricating oil composition. When the composition is for internal combustion engines, the content thereof is normally 0.01 to 5.0 mass % in terms of metal elements on the basis of the total mass of the lubricating oil composition. When the composition is for automobile transaxle units, the content thereof is normally 0.001 to 0.1 mass % in terms of metal elements on the basis of the total mass of the lubricating oil composition.

Any known viscosity index improver or pour point depressant can be used as a viscosity index improver or pour point depressant. Examples of a viscosity index improver include so-called non-dispersant viscosity index improvers such as polymers and copolymers of one or at least two monomers selected from various methacrylates, and hydrogen adducts thereof; so-called dispersant viscosity index improvers that are copolymers of various methacrylates containing nitrogen compounds; non-dispersant or dispersant ethylene-α-olefin copolymers and hydrogen adducts thereof; polyisobutylene and hydrogen adducts thereof; hydrogen adducts of styrene-diene copolymers; styrene-maleic anhydride copolymers; and polyalkylstyrenes. When the lubricating oil composition of the present invention contains a viscosity index improver, the content thereof is normally 0.1 to 20 mass % on the basis of the total mass of the lubricating oil composition.

Examples of a pour point depressant include polymethacrylate polymers. When the lubricating oil composition of the present invention contains a pour point depressant, the content thereof is normally 0.01 to 2 mass % on the basis of the total mass of the lubricating oil composition.

It is noted that while the defoaming agent according to the second aspect of the present invention is obtained by polymerizing the defoaming agent monomer in the polymerization solvent under coexistence of the polymer soluble in the polymerization solvent, the inventors have found that the coexisting polymer used in polymerization cannot be separated from the defoaming agent after polymerization.

Any known corrosion inhibitor such as benzotriazole compounds, tolyltriazole compounds, thiadiazole compounds, and imidazole compounds can be used as a corrosion inhibitor. When the lubricating oil composition of the present invention contains a corrosion inhibitor, the content thereof is normally 0.005 to 5 mass % on the basis of the total mass of the lubricating oil composition.

Any known anti-rust agent such as petroleum sulfonates, alkylbenzenesulfonates, dinonylnaphthalenesulfonates, alkylsulfonate salts, fatty acids, alkenylsuccinic acid half esters, fatty acid soaps, polyol esters of fatty acids, aliphatic amines, oxidized paraffins, and alkyl polyoxyethylene ethers can be used as an anti-rust agent. When the lubricating oil composition of the present invention contains an anti-rust agent, the content thereof is normally 0.005 to 5 mass % on the basis of the total mass of the lubricating oil composition.

Any known metal deactivator such as imidazoline, pyrimidine derivatives, alkylthiadiazoles, mercaptobenzothiazole, benzotriazole and derivatives thereof, 1,3,4-thiadiazole polysulfides, 1,3,4-thiadiazolyl-2,5-bis(dialkyldithiocarbamate), 2-(alkyldithio)benzimidazoles, and β-(o-carboxybenzylthio)propionitrile can be used as a metal deactivator. When the lubricating oil composition of the present invention contains any of these metal deactivators, the content thereof is normally 0.005 to 1 mass % on the basis of the total mass of the lubricating oil composition.

Any known demulsifier such as polyalkylene glycol-based nonionic surfactants can be used as a demulsifier. When the lubricating oil composition of the present invention contains a demulsifier, the content thereof is normally 0.005 to 5 mass % on the basis of the total mass of the lubricating oil composition.

Any known defoaming agent such as silicones, fluorosilicones, and fluoroalkyl ethers can be used as a defoaming agent other than the defoaming agents according to the first and second aspects of the present invention. When the lubricating oil composition of the present invention contains any of these defoaming agents, the content thereof is normally 0.0001 to 0.1 mass % on the basis of the total mass of the lubricating oil composition.

Any known coloring agent such as azo compounds can be used as a coloring agent.

(Lubricating Oil Composition)

The viscosity of the lubricating oil composition of the present invention is not specifically restricted. Generally, the defoaming agent according to the first and second aspects of the present invention can be preferably used in the lubricating oil composition having a kinematic viscosity at 100° C. of no less than 2 mm²/s and no more than 20 mm²/s, and is especially effective in the lubricating oil composition of relatively low viscosity having a kinematic viscosity at 100° C. of no less than 2 mm²/s and no more than 10 mm²/s.

The lubricating oil composition of the present invention, owing to improved storage stability of the defoaming agent, can suppress segregation and precipitation of the defoaming agent even during long-term storage, and thereby suppress deterioration of defoaming performance. The lubricating oil composition of the present invention can maintain good deforming performance for a long term even under such lubricating conditions that a lubricating oil is subjected to high centrifugal effect and high shear stress. As a result, foaming of the lubricating oil can be suppressed for a long term, which makes it also possible to suppress promoted deterioration of the lubricating oil, failure to control hydraulic pressure, wear and seizure, etc. induced by foaming, for a long term.

(Use)

The lubricating oil composition of the present invention can be widely used for the purpose of lubrication that demands defoaming performance especially in view of the above described functions and effect. For example, the lubricating oil composition of the present invention can be preferably used as internal combustion engine oil, hydraulic oil, industrial gear oil, turbine oil, compressor oil, transmission oil, and automobile axle unit oil, and among them, especially preferably used as automobile engine oil, automobile transmission oil, or automobile axle unit oil.

(Production)

Any known method can be employed so as to incorporate the defoaming agent of the present invention into a lubricating oil composition.

In one embodiment, a lubricating oil composition comprising the defoaming agent according to the first aspect of the present invention can be preferably produced by processes such as: dissolving the defoaming agent according to the first aspect of the present invention in a hydrocarbon solvent which can dissolve a base oil and the defoaming agent, or finely dispersing the defoaming agent according to the first aspect of the present invention in a small amount of a base oil, to prepare a dilution, and thereafter adding the dilution to a lubricating oil consisting of a base oil, or comprising a base oil and at least one additive other than the defoaming agent; or adding a solution comprising the defoaming agent according to the first aspect of the present invention, the solution having been obtained by a polymerization reaction to produce the defoaming agent according to the first aspect of the present invention, to a lubricating oil consisting of a base oil, or comprising a base oil and at least one additive other than the defoaming agent.

In another embodiment, a lubricating oil composition comprising the defoaming agent according to the second aspect of the present invention can be preferably prepared by processes such as: adding a dispersion obtained by dispersion polymerization and comprising the defoaming agent according to the second aspect of the present invention to a diluting solvent, and stirring the resultant mixture, to prepare a dilution comprising defoaming agent particles finely dispersed therein, and thereafter adding the dilution to a lubricating oil consisting of a base oil, or comprising a base oil and at least one additive other than the defoaming agent; or adding a dispersion obtained by dispersion polymerization and comprising the defoaming agent according to the second aspect of the present invention, to a lubricating oil consisting of a base oil, or comprising a base oil and at least one additive other than the defoaming agent.

In another embodiment, a lubricating oil composition comprising the defoaming agent according to the second aspect of the present invention can be also preferably prepared by: dissolving a dispersion obtained by dispersion polymerization and comprising the defoaming agent according to the second aspect of the present invention in a diluting solvent which can dissolve a base oil and the defoaming agent (such as aliphatic ketone solvents), to prepare a dilution in which the defoaming agent is dissolved, and then adding the dilution to a lubricating oil consisting of a base oil, or comprising the base oil and at least one additive other than the defoaming agent, to make the defoaming agent finely dispersed in the lubricating oil.

In another embodiment, a lubricating oil composition comprising the defoaming agent according to the second aspect of the present invention can be also prepared by processes such as: adding a solution obtained by solution polymerization and comprising the defoaming agent according to the second aspect of the present invention to a diluting solvent, and stirring the resultant mixture, to prepare a dilution in which the defoaming agent is finely dispersed, and then adding the dilution to a lubricating oil consisting of a base oil, or comprising a base oil and at least one additive other than the defoaming agent; or adding a solution obtained by solution polymerization and comprising the defoaming agent according to the second aspect of the present invention, to a lubricating oil consisting of a base oil, or comprising the base oil and at least one additive other than the defoaming agent.

In another embodiment, a lubricating oil composition comprising the defoaming agent according to the second aspect of the present invention can be also prepared by: dissolving a solution comprising the defoaming agent according to the second aspect of the present invention in a diluting solvent which can dissolve a base oil and the defoaming agent (such as aliphatic ketone solvents), to prepare a dilution in which the defoaming agent is dissolved, and then adding the dilution to a lubricating oil consisting of a base oil, or comprising the base oil and at least one additive other than the defoaming agent, and stirring the resultant mixture, to make the defoaming agent finely dispersed in the lubricating oil. A solvent which is soluble in the base oil and can dissolve the defoaming agent or make the defoaming agent finely dispersed therein can be preferably used as the diluting solvent. A base oil may be used as the diluting solvent.

The concentration of the defoaming agent in the dilution is preferably no less than 500 mass ppm, more preferably no less than 1,000 mass ppm, further preferably no less than 3,000 mass ppm, preferably no more than 50,000 mass ppm, and more preferably no more than 40,000 mass ppm, in terms of silicon on the basis of the total mass of the dilution. The concentration of the defoaming agent in the dilution of this lower limit or over makes it possible to suppress decrease of a flash point of the lubricating oil induced by the dilution. The concentration of the defoaming agent in the dilution of this upper limit or below makes it easy to suppress decrease of the lifetime of the defoaming agent induced by precipitation of the defoaming agent.

The amount of the dilution to be added to the lubricating oil can be such that the above described preferred concentration of the defoaming agent in the lubricating oil composition of the present invention is realized.

The lubricating oil before addition of the dilution may already contain additives other than the defoaming agent in addition to a base oil. One may also add the dilution to a lubricating oil consisting of a base oil and not comprising additives other than the defoaming agent, and thereafter add other additives.

When adding the dilution to a lubricating oil, one may add the dilution to the lubricating oil little by little successively (for example, dropwise) while mixing, or one may add a desired amount of the dilution to the lubricating oil in one portion. In view of making it easier to more finely disperse the defoaming agent in the lubricating oil, or improving uniformity of the concentration of the defoaming agent in the lubricating oil composition, it is preferable to successively add the dilution while mixing.

EXAMPLES

Hereinafter the present invention will be more specifically described based on Examples and Comparative examples. The following examples are intended to show examples of the present invention, but not intended to limit the present invention.

<Preparation Examples>

(Measurement of Molecular Weight and Molecular Weight Distribution)

In the following preparation examples and examples, molecular weights and molecular weight distributions were measured using a GPC system (HLC-8220 manufactured by Tosoh Corporation) equipped with three columns (TSKgel SuperMultiporeHZ-M; 4.6 mm in internal diameter×15 cm, manufactured by Tosoh Corporation) connected in series, and a differential refractometer (RI) using tetrahydrofuran as a mobile phase, and using polystyrene as a standard material, under conditions of measurement temperature: 40° C., flow rate: 0.35 mL/min, sample concentration: 1 mass %, and sample injection volume: 5 µL.

(Preparation Example 1)

A defoaming agent A according to the first aspect of the present invention was prepared by the following procedures:

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 5 parts by mass of the polysiloxane macromonomer represented by the following general formula (25) (manufactured by Shin-Etsu Chemical Co., Ltd.; weight average molecular weight: 43,000; polydispersity index (Mw/Mn): 1.50), and 95 parts by mass of lauryl methacrylate were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; manufactured by Wako Pure Chemical Industries, Ltd.) as a radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent A. The weight average molecular weight (Mw) of the obtained defoaming agent A was 120,000, and the polydispersity index (Mw/Mn) thereof was 3.08:

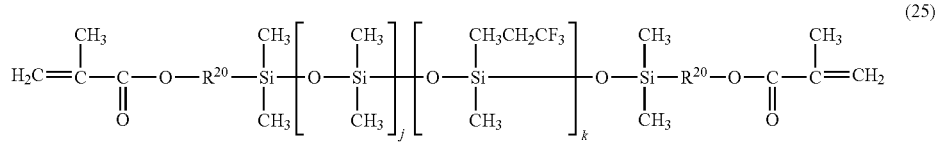

(25)

wherein in the formula (25), $R^{20}$ is a propylene group; and the average fluorination ratio of the polysiloxane structure is 0.5.

(Preparation Example 2)

A defoaming agent B according to the first aspect of the present invention was prepared by the following procedures:

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 20 parts by mass of the polysiloxane macromonomer represented by the following general formula (25) (manufactured by Shin-Etsu Chemical Co., Ltd.; weight average molecular weight: 43,000; polydispersity index (Mw/Mn): 1.50), and 80 parts by mass of lauryl methacrylate were introduced and stirred to be a uniform mixture, and thereafter the reaction system was vacuum-degassed and purged with nitrogen five times using a diaphragm pump. Under a nitrogen flow, 1.5 parts by mass of MAIB (dimethyl 2,2'-azobisisobutyrate: azo radical polymerization initiator; manufactured by Wako Pure Chemical Industries, Ltd.) as a radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent B. The weight average molecular weight (Mw) of the obtained defoaming agent B was 55,000, and the polydispersity index (Mw/Mn) thereof was 3.04:

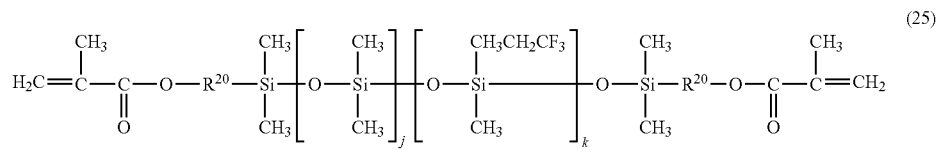

(25)

wherein in the formula (25), $R^{20}$ is a propylene group; and the average fluorination ratio of the polysiloxane structure is 0.5.

(Preparation Example 3)

A defoaming agent C according to the first aspect of the present invention was prepared by the following procedures:

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 5 parts by mass of the polysiloxane macromonomer represented by the following general formula (25) (manufactured by Shin-Etsu Chemical Co., Ltd.; weight average molecular weight: 43,000; polydispersity index (Mw/Mn): 1.50), and 95 parts by mass of 2-ethylhexyl methacrylate were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; manufactured by Wako Pure Chemical Industries, Ltd.) as a radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent C. The weight average molecular weight (Mw) of the obtained defoaming agent C was 175,000, and the polydispersity index (Mw/Mn) thereof was 3.39:

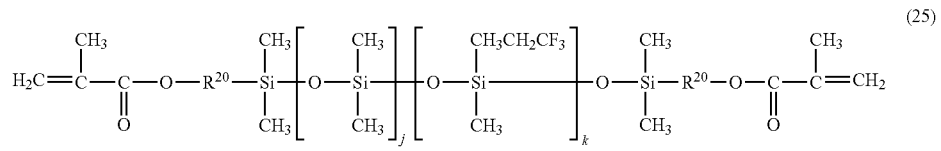

(25)

wherein in the formula (25), $R^{20}$ is a propylene group; and the average fluorination ratio of the polysiloxane structure is 0.5.

(Preparation Example 4)

A defoaming agent D according to the first aspect of the present invention was prepared by the following procedures:

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 1 part by mass of the polysiloxane macromonomer represented by the following general formula (25) (manufactured by Shin-Etsu Chemical Co., Ltd.; weight average molecular weight: 43,000; polydispersity index (Mw/Mn): 1.50), and 99 parts by mass of 2-ethylhexyl methacrylate were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; manufactured by Wako Pure Chemical Industries, Ltd.) as a radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent D. The weight average molecular weight (Mw) of the obtained defoaming agent D was 145,000, and the polydispersity index (Mw/Mn) thereof was 2.92:

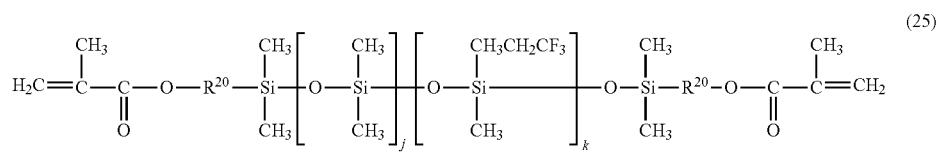

(25)

wherein in the formula (25), $R^{20}$ is a propylene group; and the average fluorination ratio of the polysiloxane structure is 0.5.

(Preparation Example 5)

A defoaming agent E according to the first aspect of the present invention was prepared by the following procedures:

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 80 parts by mass of the polysiloxane macromonomer represented by the following general formula (25) (manufactured by Shin-Etsu Chemical Co., Ltd.; weight average molecular weight: 43,000; polydispersity index (Mw/Mn): 1.50), 20 parts by mass of lauryl methacrylate, and 3.0 parts by mass of dodecyl mercaptan were introduced and stirred to be a uniform mixture, and thereafter the reaction system was vacuum-degassed and purged with nitrogen five times using a diaphragm pump. Under a nitrogen flow, 1.0 parts by mass of MAIB (dimethyl 2,2'-azobisisobutyrate: azo radical polymerization initiator; manufactured by Wako Pure Chemical Industries, Ltd.) as a radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent E. The weight average molecular weight (Mw) of the obtained defoaming agent E was 126,000, and the polydispersity index (Mw/Mn) thereof was 1.45:

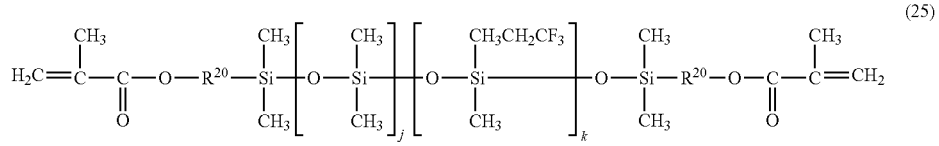

(25)

wherein in the formula (25), $R^{20}$ is a propylene group; and the average fluorination ratio of the polysiloxane structure is 0.5.

(Preparation Example 6)

A defoaming agent F according to the first aspect of the present invention was prepared by the following procedures:

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 60 parts by mass of the polysiloxane macromonomer represented by the following general formula (25) (manufactured by Shin-Etsu Chemical Co., Ltd.; weight average molecular weight: 77,000; polydispersity index (Mw/Mn): 1.63), 40 parts by mass of lauryl methacrylate, and 1.0 part by mass of dodecyl mercaptan were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; manufactured by Wako Pure Chemical Industries, Ltd.) as a radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent F. The weight average molecular weight (Mw) of the obtained defoaming agent F was 17,000, and the polydispersity index (Mw/Mn) thereof was 2.41:

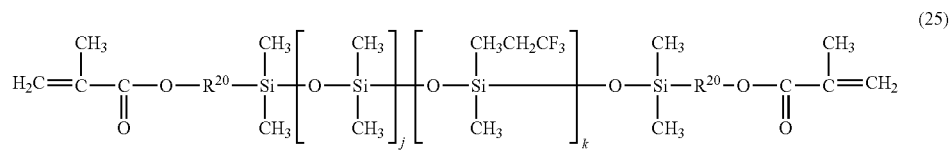

(25)

wherein in the formula (25), $R^{20}$ is a propylene group; and the average fluorination ratio of the polysiloxane structure is 0.5.

<Examples 1 to 6 and Comparative Examples 1 to 3>

As shown in Table 1, lubricating oil compositions according to the third aspect of the present invention (Examples), and lubricating oil compositions for comparison (Comparative examples) were prepared. In Table 1, "Si ppm" means mass ppm in terms of silicon. In Examples 1 to 6, defoaming agents were incorporated into lubricating oil compositions by adding a solution of each of the defoaming agents A to F obtained by the Production examples 1 to 6 dropwise into a lubricating oil composition while stirring, to prepare each of the lubricating oil compositions of Examples 1 to 6 having the defoaming agent concentration as in Table 1. In Comparative examples 1 and 2, defoaming agents were incorporated into lubricating oil compositions by the following procedures: first, each defoaming agent was added to kerosene and was sufficiently stirred, to prepare a dilution in which the defoaming agent was dissolved in kerosene (defoaming agent concentration: 0.3 mass % in terms of silicon on the basis of the total mass of the dilution); and thereafter the dilution was added to a lubricating oil composition dropwise while stirring, to prepare the lubricating oil compositions of Comparative examples 1 and 2 having the defoaming agent concentration as in Table 1. In Comparative example 3, the lubricating oil composition of Comparative example 3 having the defoaming agent concentration as in Table 1 was prepared by the same procedures as Comparative examples 1 and 2, except that methyl ethyl ketone was used as the diluting solvent instead of kerosene.

(Evaluation of Defoaming Performance of Fresh Oil (1): Homogenizer Test)

Defoaming performance of each of the prepared lubricating oil compositions was evaluated by a homogenizer test machine shown in FIG. 1. The homogenizer test machine shown in FIG. 1 includes a homogenizer 1, a cylindrical heater for heating 2, a temperature adjuster 3, a thermocouple for oil temperature measurement 4, an electric power source for the heater 5, a glass cylinder corresponding to an oil tank 6 (graduated cylindrical glass vessel, 40 mm in inner diameter, 300 mm in depth, 2 mL grading divisions from 0 to 250 mL), and an air blow tube (air blow rate: 30 mL/min) 7.

To the glass cylinder 6, 150 mL of a sample oil was introduced. The temperature of the sample oil was raised by the cylindrical heater for heating 2 to 120° C. The oil surface level at this time was recorded as a reference oil surface level 8. The oil was stirred with the homogenizer 1, and the difference between the oil surface level after 10 minutes stirring and the reference oil surface level was recorded as the amount of foaming. The results are shown in Table 1.

(Evaluation of Storage Stability, and Durability Against Centrifugal Effect and Shearing (1): Homogenizer Test)

(a) A sample oil which has experienced centrifugation or shearing by sonication was obtained by operation of the following (i) or (ii) on each of the prepared lubricating oil compositions.

(i) Centrifugation

Four glass centrifuge tubes filled to the 60 mL graduation mark with sample oils were prepared. These four centrifuge tubes with the sample oil were set in a centrifuge, and rotated

TABLE 1

| | | | Examples | | | | | | Comparative examples | | |
|---|---|---|---|---|---|---|---|---|---|---|---|
| | | | 1 | 2 | 3 | 4 | 5 | 6 | 1 | 2 | 3 |
| Lubricating oil | Transmission oil (*1) | | balance | balance | balance | balance | balance | balance | balance | balance | balance |
| Defoaming agent | Defoaming agent A | Si ppm | 10 | | | | | | | | |
| | Defoaming agent B | Si ppm | | 10 | | | | | | | |
| | Defoaming agent C | Si ppm | | | 10 | | | | | | |
| | Defoaming agent D | Si ppm | | | | 10 | | | | | |
| | Defoaming agent E | Si ppm | | | | | 10 | | | | |
| | Defoanning agent F | Si ppm | | | | | | 10 | | | |
| | Defoaming agent G (*2) | Si ppm | | | | | | | 10 | | |
| | Defoaming agent H (*3) | Si ppm | | | | | | | | 10 | |
| | Defoaming agent I (*4) | Si ppm | | | | | | | | | 10 |
| Fresh oil | | mL | 40 | 40 | 40 | 40 | 40 | 40 | 70 | 40 | 40 |
| Amount of foaming in homogenizer test | | | | | | | | | | | |
| Silicon content in the oil | | ppm | 10 | 10 | 10 | 10 | 10 | 10 | 10 | 10 | 10 |
| Supernatant after 3 h centrifugation | | mL | 40 | 40 | 40 | 40 | 40 | 40 | 100 | 100 | 100 |
| Amount of foaming in homogenizer test | | | | | | | | | | | |
| Silicon content in the oil | | ppm | 9 | 9 | 8 | 8 | 9 | 8 | <1 | <1 | <1 |
| After 4 h shearing | | mL | 40 | 40 | 40 | 40 | 40 | 40 | 100 | 100 | 40 |
| Amount of foaming in homogenizer test | | | | | | | | | | | |

(*1) transmission oil obtained by removing defoaming agents from "ENEOS FINE AT FLUID" (available from JX Nippon Oil & Energy Corporation), kinematic viscosity at 100° C.: 7.3 mm²/s
(*2) KF-96 (available from Shin-Etsu Chemical Co., Ltd.), viscosity: 5,000 cSt, dimethyl silicone defoaming agent
(*3) KF-96 (available from Shin-Etsu Chemical Co., Ltd.), viscosity: 50,000 cSt, dimethyl silicone defoaming agent
(*4) polysiloxane macromonomer represented by the general formula (25), Mw 43,000, Mw/Mn 1.50, $R^{20}$ = propylene group, average fluorination ratio of the polysiloxane structure = 0.5, available from Shin-Etsu Chemical Co., Ltd.

at 25° C. at 10,000 rpm for 180 minutes. The relative centrifugal force in this rotation was 8,000 G on average. After the centrifugation, a supernatant (200 mL in total) was recovered.

(ii) Shearing by Sonication

Conforming to JASO M347 (test method for shear stability of automatic transmission fluids), 200 mL of a sample oil which has experienced 4 h shearing by sonication was obtained.

(b) Homogenizer Test

Defoaming performance of the sample oil recovered after the operation of the (i) or (ii) was evaluated by the homogenizer test same as described above. The results are shown in Table 1. Less increase of the amount of foaming after the centrifugation means a less tendency for the defoaming agent to cause segregation and precipitation during storage, and means less deterioration of defoaming performance induced by centrifugal effect. Less increase of foaming after shearing by sonication means less decrease of deforming performance induced by shearing.

(Evaluation of Storage Stability and Durability Against Centrifugal Effect (2): Measurement of Silicon Content in Oil)

(a) Measurement of Silicon Content in Fresh Oil

The silicon content in the fresh oil of each of the above prepared lubricating oil compositions was measured by inductively coupled plasma (ICP) atomic emission spectroscopy.

(b) Measurement of Silicon Content in Oil after Centrifugation

A sample oil which has experienced 3 h centrifugation was obtained by the operation of the (i) on each of the prepared lubricating oil compositions as described above. The silicon content in the oil of the recovered supernatant was measured in the same way as described above by ICP atomic emission spectroscopy. The silicon content in the oil after the centrifugation closer to that in the fresh oil means a less tendency for the defoaming agent to cause separation and precipitation during storage, and means less loss of the defoaming agent induced by centrifugal effect.

As can be seen from Table 1, all the lubricant oil compositions of Examples 1 to 6 showed good defoaming performance of the sample oils after the centrifugation and shearing, but also of fresh oils. These lubricating oil compositions of Examples 1 to 6 also showed less decrease of the silicon contents in the oils even after the centrifugation. In contrast, in the lubricating oil compositions of Comparative examples 1 and 2, the sample oils after the centrifugation and shearing showed significantly deteriorated defoaming performance compared to that of the fresh oils. As regards the lubricating oil composition of Comparative example 3, the sample oil after the shearing showed better defoaming performance, but the sample oil after the centrifugation showed significantly worse defoaming performance than that of the fresh oil. The silicon contents in the oils of the lubricant oil compositions of Comparative examples 1 to 3 significantly decreased after the centrifugation.

The above test results show that the defoaming agent and lubricating oil composition of the present invention can suppress deterioration of defoaming performance even during long-term storage, and can maintain deforming performance of lubricating oil for a long term even under such lubricating conditions that the lubricating oil is subjected to high centrifugal and shear effects.

INDUSTRIAL APPLICABILITY

The deforming agent and the lubricating oil composition of the present invention can suppress deterioration of defoaming performance even during long-term storage, and can maintain deforming performance of lubricating oil for a long term even under such lubricating conditions that the lubricating oil is subjected to high centrifugal and shear effects. Thus, the deforming agent and the lubricating oil composition of the present invention can be preferably employed for any lubricating oil composition that demands defoaming performance, and among them, can be especially preferably employed in lubricating oil used under such lubricating conditions that the lubricating oil is subjected to high centrifugal effect, for example, in automobile engine oil, automobile transmission oil, or automobile transaxle oil.

REFERENCE SIGNS LIST 1 homogenizer
2 cylindrical heater for heating
3 temperature adjuster
4 thermocouple for oil temperature measurement
5 electric power source for the heaters
6 glass cylinder corresponding to an oil tank (graduated cylindrical glass vessel, 40 mm in inner diameter, 300 mm in depth, 2 mL grading divisions from 0 to 250 mL)
7 air blow tube (air blow rate: 30 mL/min)
8 reference oil surface level

We claim:

1. A defoaming agent comprising:
a polymer obtainable by copolymerization of a first component and a second component;
the first component being at least one polysiloxane macromonomer selected from compounds represented by the following general formula (7) or (8); and
the second component being at least one monomer represented by the following general formula (9):

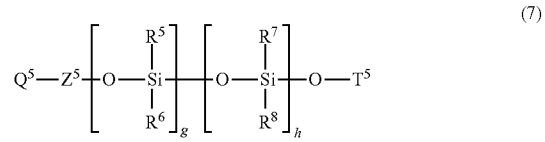

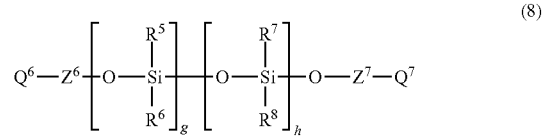

wherein
in the general formulae (7) and (8), polysiloxane repeating units may be in any order;
each of $R^5$ and $R^6$ is independently a $C_{1-18}$ organic group comprising no fluorine atom;
each of $R^7$ and $R^8$ is independently an organic group comprising no less than 3 fluorine atoms or a $C_{1-18}$ organic group comprising no fluorine atom, wherein at least one of $R^7$ and $R^8$ is the organic group comprising no less than 3 fluorine atoms;
each of $Q^5$, $Q^6$, and $Q^7$ is independently a polymerizable functional group comprising an ethylenic unsaturated group;
$Z^5$ is a linking group linking the polymerizable functional group $Q^5$ and a polysiloxane moiety;
$Z^6$ is a linking group linking the polymerizable functional group $Q^6$ and a polysiloxane moiety;

$Z^7$ is a linking group linking the polymerizable functional group $Q^7$ and a polysiloxane moiety;
$T^5$ is a non-polymerizable organic group;
g is an integer of no less than 0;
h is an integer of no less than 1; and
g+h is 5 to 2000, $$Q^8\text{-}Z^8\text{—}Y^8 \quad (9)$$

wherein in the general formula (9), $Q^8$ is a polymerizable functional group comprising an ethylenic unsaturated group;
$Y^8$ is a substituted or unsubstituted $C_{1-40}$ hydrocarbyl group, wherein the substituted hydrocarbyl group is a fluoroalkyl group, a fluoroalkyl (poly)ether group, or a substituted hydrocarbyl group having 1 to 3 heteroatoms,
wherein the substituted hydrocarbyl group having 1 to 3 heteroatoms is a substituted hydrocarbyl group obtainable from an unsubstituted hydrocarbyl group by substituting at least one hydrogen atom with a heteroatom-containing group, substituting at least one methylene group with ether bond, a secondary amino group, or thioether bond, or substituting at least one methine group with a tertiary amino group, or any combination thereof wherein the substituted hydrocarbyl group does not comprise three ether bonds,
wherein the heteroatom-containing group is hydroxy group, mercapto group, primary amino group, an amine residue having 1 to 2 nitrogen atoms and 0 to 2 oxygen atoms, a heterocycle residue having 1 to 2 nitrogen atoms and 0 to 2 oxygen atoms, or a cyclic ether group having 2 to 5 carbons; and
$Z^8$ is a linking group linking $Q^8$ and $Y^8$.

2. The defoaming agent according to claim 1,
wherein in the first component, a ratio of a total number of polysiloxane repeating units comprising fluorine atoms to a total number of all polysiloxane repeating units is 0.01 to 1.

3. The defoaming agent according to claim 1,
wherein an amount of the first component in the copolymerization is 0.5 to 80 parts by mass on the basis of the total amount of the first component and the second component as 100 parts by mass.

4. The defoaming agent according to claim 1,
wherein $Q^5$, $Q^6$, and $Q^7$ comprise (meth)acryloyl group.

5. The defoaming agent according to claim 1,
wherein the polymer has a weight average molecular weight of 10,000 to 1,000,000.

6. The defoaming agent according to claim 1,
wherein the first component has a weight average molecular weight of 500 to 500,000.

7. A lubricating oil composition comprising:
a lubricating base oil; and
the defoaming agent as in claim 1, in an amount of 1 to 500 mass ppm in terms of silicon on the basis of the total mass of the composition.

8. A method for lubricating an automobile engine, an automobile transmission, or an automobile transaxle unit, the method comprising:
supplying the lubricating oil composition according to claim 7 to the automobile engine, or to the automobile transmission, or to the automobile transaxle unit.

9. A defoaming agent comprising:
a polymer obtainable by copolymerization of a first component and a second component;
the first component being at least one polysiloxane macromonomer selected from compounds represented by the following general formula (7) or (8); and
the second component being at least one monomer represented by the following general formula (9):

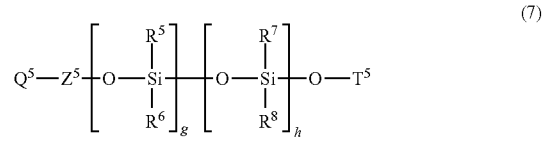

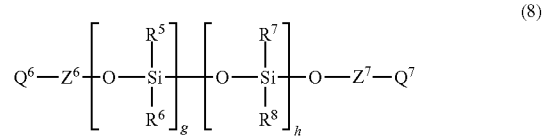

wherein
in the general formulae (7) and (8), polysiloxane repeating units may be in any order;
each of $R^5$ and $R^6$ is independently a $C_{1-18}$ organic group comprising no fluorine atom;
each of $R^7$ and $R^8$ is independently an organic group comprising no less than 3 fluorine atoms or a $C_{1-18}$ organic group comprising no fluorine atom, wherein at least one of $R^7$ and $R^8$ is the organic group comprising no less than 3 fluorine atoms;
each of $Q^5$, $Q^6$, and $Q^7$ is independently a polymerizable functional group comprising an ethylenic unsaturated group;
$Z^5$ is a linking group linking the polymerizable functional group $Q^5$ and a polysiloxane moiety;
$Z^6$ is a linking group linking the polymerizable functional group $Q^6$ and a polysiloxane moiety;
$Z^7$ is a linking group linking the polymerizable functional group $Q^7$ and a polysiloxane moiety;
$T^5$ is a non-polymerizable organic group;
g is an integer of no less than 0;
h is an integer of no less than 1; and
g+h is 5 to 2000, $$Q^8\text{-}Z^8\text{—}Y^8 \quad (9)$$

wherein in the general formula (9), $Q^8$ is a polymerizable functional group comprising an ethylenic unsaturated group;
$Y^8$ is substituted or unsubstituted $C_{1-40}$ hydrocarbyl group, wherein the substituted hydrocarbyl group is a fluoroalkyl group, or a substituted hydrocarbyl group having 1 to 3 heteroatoms,
wherein the substituted hydrocarbyl group having 1 to 3 heteroatoms is a substituted hydrocarbyl group obtainable from an unsubstituted hydrocarbyl group by substituting at least one hydrogen atom with a heteroatom-containing group, substituting at least one methylene group with ether bond, a secondary amino group, or thioether bond, or substituting at least one methine group with a tertiary amino group, or any combination thereof wherein the substituted hydrocarbyl group does not comprise three ether bonds,
wherein the heteroatom-containing group is hydroxy group, mercapto group, primary amino group, an amine residue having 1 to 2 nitrogen atoms and 0 to 2 oxygen atoms, a heterocycle residue having 1 to 2 nitrogen atoms and 0 to 2 oxygen atoms, or a cyclic ether group having 2 to 5 carbons; and
$Z^8$ is a linking group linking $Q^8$ and $Y^8$.

10. The defoaming agent according to claim 9, wherein in the first component, a ratio of a total number of polysiloxane repeating units comprising fluorine atoms to a total number of all polysiloxane repeating units is 0.01 to 1.

11. The defoaming agent according to claim 9, wherein an amount of the first component in the copolymerization is 0.5 to 80 parts by mass on the basis of the total amount of the first component and the second component as 100 parts by mass.

12. The defoaming agent according to claim 9, wherein $Q^5$, $Q^6$, and $Q^7$ comprise (meth)acryloyl group.

13. The defoaming agent according to claim 9, wherein the polymer has a weight average molecular weight of 10,000 to 1,000,000.

14. The defoaming agent according to claim 9, wherein the first component has a weight average molecular weight of 500 to 500,000.

15. A lubricating oil composition comprising:
a lubricating base oil; and
the defoaming agent as in claim 9, in an amount of 1 to 500 mass ppm in terms of silicon on the basis of the total mass of the composition.

16. A method for lubricating an automobile engine, an automobile transmission, or an automobile transaxle unit, the method comprising:
supplying the lubricating oil composition according to claim 15 to the automobile engine, or to the automobile transmission, or to the automobile transaxle unit.

* * * * *